United States Patent [19]

Heitzman et al.

[11] Patent Number: 4,814,896

[45] Date of Patent: Mar. 21, 1989

[54] REAL TIME VIDEO DATA ACQUISTION SYSTEMS

[76] Inventors: Edward F. Heitzman; Edward J. Heitzman, both of 6 Moores Mill Rd., Pennington, N.J. 08534

[21] Appl. No.: 22,969

[22] Filed: Mar. 6, 1987

[51] Int. Cl.[4] .............................................. H04N 5/76
[52] U.S. Cl. .................................... 358/335; 340/721; 340/722; 358/103; 434/65
[58] Field of Search .............. 358/183, 108, 103, 335; 340/721, 722, 717, 705, 980; 360/5, 6, 33.1, 37.1

[56] References Cited

U.S. PATENT DOCUMENTS

| | | | |
|---|---|---|---|
| 3,521,228 | 7/1970 | Congleton et al. | 340/721 |
| 3,537,096 | 10/1970 | Hatfield | 340/721 |
| 3,668,622 | 6/1972 | Gannett et al. | 358/103 |
| 3,909,792 | 9/1975 | Harris et al. | 340/721 |
| 4,034,990 | 7/1977 | Baer | 340/721 |
| 4,214,273 | 7/1980 | Brown | 340/722 |
| 4,218,707 | 8/2980 | Reed et al. | 340/722 |
| 4,267,728 | 5/1981 | Manley et al. | 340/721 |
| 4,331,962 | 5/1982 | Neumann | 340/721 |
| 4,457,716 | 7/1984 | Eserhaut et al. | 434/43 |
| 4,716,458 | 12/1987 | Hetzman et al. | 358/103 |
| 4,740,838 | 4/1988 | Mase et al. | 358/103 |

*Primary Examiner*—Donald McElheny, Jr.
*Attorney, Agent, or Firm*—Arthur L. Plevy

[57] ABSTRACT

A real time video data acquisition system is provided in accordance with the teachings of the present invention wherein one or more blocks of data is stored in serial form on one horizontal scan line of a video picture. Each block of data may consist of a synchronizing word followed by a plurality of data words in the form of an array of digitized analog samples. The data words in eahc block may represent multiplexed data from several measurement instruments or data from a single measurement instrument sampled at a high rate. The video information is presented in remaining horizontal scan lines and audio information is presented in the conventional manner of a video system. Each block of data may be updated once per video field, the data being stored synchronously with a record/recovery clock whose frequency and phase are controlled by the video signal. The invention thus presents, in real time, video and audio information together with data measured.

27 Claims, 10 Drawing Sheets

REAL TIME VIDEO DATA ACQUISTION SYSTEMS

BACKGROUND

This invention relates to real time video data acquisition system and more particularly methods and apparatus for synchronously recording, transmitting and reproducing composites of video, audio and instrumentation data on a real time basis.

Research, development and testing activities frequently require that data obtained from measuring instrumentation or the like be interpreted in light of additional matter concerning the test environment and particularly instantaneous, observable conditions coinciding with measurements obtained through instrumentation. This is particularly so when the research or testing involves a man machine interface since environmental factors at work at the interface or observable events occurring thereat often strongly influence the instrumentation data obtained and/or present mandatory factors which must be considered in interpreting the same. While such instantaneously occurring data frequently cannot be readily measured, it can be seen and/or heard.

Such instantaneous environmental data and/or observable conditions have, in the past, been recorded by way of motion pictures, audio recorders and more recently by way of video recorders. However, when recording media of this type is employed in conjunction with instrumentation data which is recorded on strip charts, analog or digital tape recorders, or the like, the synchronism in time of the different reproducing media is difficult and often impossible to achieve with sufficient accuracy to permit an accurate correlation of the various forms of data for the events displayed and recorded. Efforts to alleviate such difficulties in achieving accurate synchronism have frequently involved elaborate timing and correlation systems. However, in each case data acquisition systems where all data measured is presented by way of an overlay of such data on the instantaneous video and audio data obtained is greatly preferred. Such overlays have, in the past, been created by use of computer synthesis and/or graphic overlay techniques; however, these do not result in real time presentations.

Therefore, it is a principal object of the present invention to provide real time video data acquisition systems wherein picture, sound and quality instrumentation data may be synchronously recorded, transmitted and/or displayed.

A further object of this invention is to provide methods and apparatus for synchronously recording picture, sound and quality instrumentation data on a conventional video tape recorder.

An additional object of the present invention is to provide methods and apparatus for recording blocks of digital data on one or more picture lines.

A further object of the present invention is to provide methods and apparatus for recording and reproducing additional data synchronously with a clock which is frequency-slaved to the video horizontal frequency and phase controlled by the horizontal signal and by 0/1 transitions in the data train.

Another object of the present invention is to provide a data acquisition system which digitizes analog data, records the same in digital form, and plays back such data simultaneously in RAM formatted digital, parallel analog and visual bar graph and/or numeric form all in real time.

Various other objects and advantages of the present invention will become clear from the following detailed description of an exemplary embodiment thereof and the novel features will be particularly pointed out in conjunction with the claims appended hereto.

SUMMARY OF THE INVENTION

In accordance with the teachings of the present invention, a real time video data acquisition system is provided wherein one or more blocks of data, each block of data consisting of a synchronizing word followed by a plurality of data words in the form of an array of digitized analog samples, is stored in serial form on one horizontal scan line of a video picture; the data words in each block may represent multiplexed data from several measurement instruments or data from a single measurement instrument sampled at a high rate; the video information is presented in remaining horizontal scan lines and audio information is presented in the conventional manner of a video system; each block of data may be updated once per video field, the data being stored synchronously with a record/recovery clock whose frequency and phase are controlled by the video signal to thus present in real time, video and audio information together with data measured.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION

To facilitate the disclosure of the instant invention, the real time video data acquisition system disclosed herein shall be described in connection with an application which is well suited to the instant invention. This application involves the field of automotive testing and research in automobile-driver interactions. For such tests the car is typically driven in severe maneuvers on a race track, over a pylon-marked course on a large open paved area, or on public roads. The attitude of the vehicle with respect to travel lane boundaries and the traffic situation as perceived by the driver are monitored on a video camera, as are driver commentary and sounds emitted by the vehicle. In addition, data from potentiometers, accelerometers, gyroscopes, force load cells, speed measuring devices and the like are measured and recorded.

When data from the visible, audible, and instrumentation sources are recorded separately and nonsynchronously, severe difficulties arise in their interpretation. For example: did the driver turn the steering wheel because he sensed with amazingly short reaction time that a skid was commencing, or because there was a lane boundary or a pylon directly ahead? Did his brake pedal force decrease before or after he hit the pylon? The real time video data acquisition system disclosed herein, wherein pictorial, audible, and instrumentation data are inherently and precisely synchronized and presented in real time composite form, produces eminently enhanced research insights compared to separate recordings which must be artificially synchronized during post-test analysis.

A secondary but nonetheless important advantage of the system described herein is the operational simplicity in handling and storage of one, rather than several, data recording media.

As many as twelve or more instrument readings on the vehicle under test may be taken depending upon the type of condition for which the test is being conducted. Thus the velocity of the vehicle, its acceleration, its angle, its steering angle, the rpm of the motor, as well as various pressures in the motor and the tires, may be desired for the tests being conducted. Under such conditions, it will be demonstrated that a real time video data acquisition system, such as disclosed herein, wherein the drivers view of the test track, sounds emitted by the vehicle and the driver, as well as all data being measured is presented in a real time composite is eminently preferable to separate recordings which must be synchronized in time for appropriate analysis of all factors present.

Figure 1:
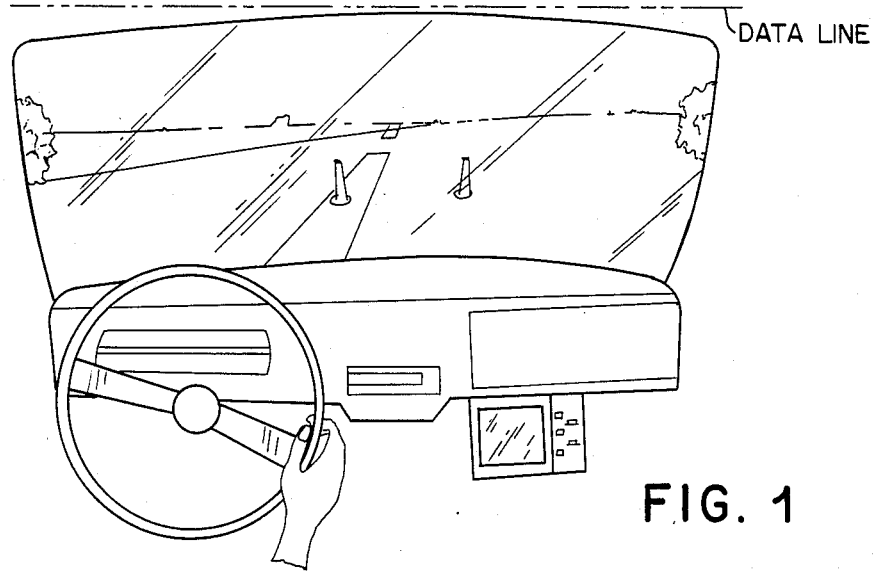
FIG. 1 is a pictorial view of a video scene illustrating the usual mode of recording in the real time video data acquisition system according to the present invention, which consists of a video picture in which a data line (dashed) and shown near the top of the visible area of the picture contains digitized and recorded transducer data.

Referring now to FIG. 1 there is shown a pictorial view illustrating one mode of data presentation of a preferred embodiment of the real time video data acquisition system according to the present invention. More particularly, as illustrated in FIG. 1, the instant invention presents for monitoring or recording on a conventional video tape recorder (VTR) the driver's view of the test track and all sounds emitted by the driver or vehicle during that test in the conventional manner of a video data acquisition and recording system. In addition, instrumentation data being monitored is presented superimposed on the video image monitored, recorded or transmitted as one or more data lines which appear as a series of white dashes of varying length separated by black spaces of varying length shown in FIG. 1 as the data line.

Each block of data is an array of digitized analog samples stored in serial form on one horizontal scan line of the video picture. Each block consists of a fixed synchronizing word, followed by a number of data words wherein the data words in each block may represent multiplexed data from several transducers, i.e. up to twelve multiplexed data channels of 12 bits each sampled once per video field. Data from a single transducer which has been sampled at a higher rate, i.e. one data channel of 10 bits sampled sixteen times per field or 960 times per second may also be acquired. Thus data acquired at this higher rate is stored on a real time basis as a line of information and available for application to a computer interface. While only one data line indicative of a data block is stored in only one horizontal line scan is illustrated in FIG. 1 in principal, data blocks may be stored on any horizontal scan line after the vertical-sync post - equalizing pulses, and the number of data blocks used is limited only by obtrusiveness in the video picture.

In the preferred embodiment of the invention disclosed herein the real time video data acquisition system provides for a maximum of ten data blocks located in the active video field at the very top of the picture so that data lines may be seen on a monitor. A visible data line, as illustrated in FIG. 1, can be decoded directly by observation only by an experienced operator; however, a dead, off scale or oscillating transducer serving as the instrument for measuring a predetermined condition of the vehicle can be identified immediately by inspection of the data line so that testing may immediately be terminated to correct the instrument.

Figure 2:
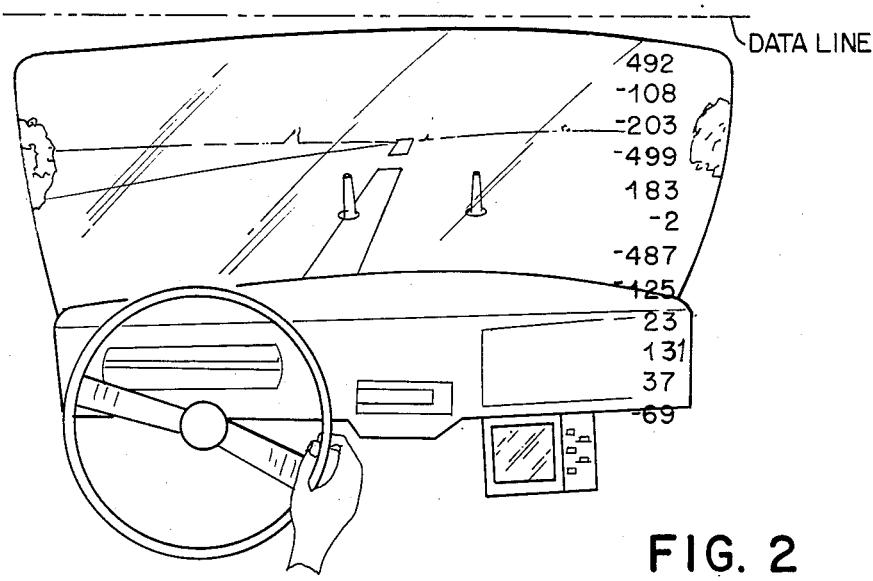
FIG. 2 is a pictorial view of a video scene having numeric data superimposed thereon according to one data display mode of this system.

FIG. 2 is a pictorial view illustrating an enhanced mode of data presentation of the preferred embodiment of the real time video data acquisition system according to the present invention wherein the data liner mode of presentation is combined with a numerical display of data represented by said data line. Thus, as illustrated in FIG. 2, a column of numerals is vertically disposed on the right-hand portion of the video display. Each numeral listed represents a decoding of one of the blocks of data set forth in the data line disposed across the top of the illustration and the numerals are set forth (usually but not necessarily) in,, the order in which the blocks of data are present in the data line. Thus it will be seen that the real time video data acquisition system according to the instant invention presents, in a single view on a monitor to which the data is presented, transmitted and/or played back after video recording, a real time composite of all conditions sought to be monitored during a test conducted. While a vehicle testing application is here being considered, those of ordinary skill in the art will appreciate that the instant invention will have wide application to many areas of general research, testing and development.

Figure 3:
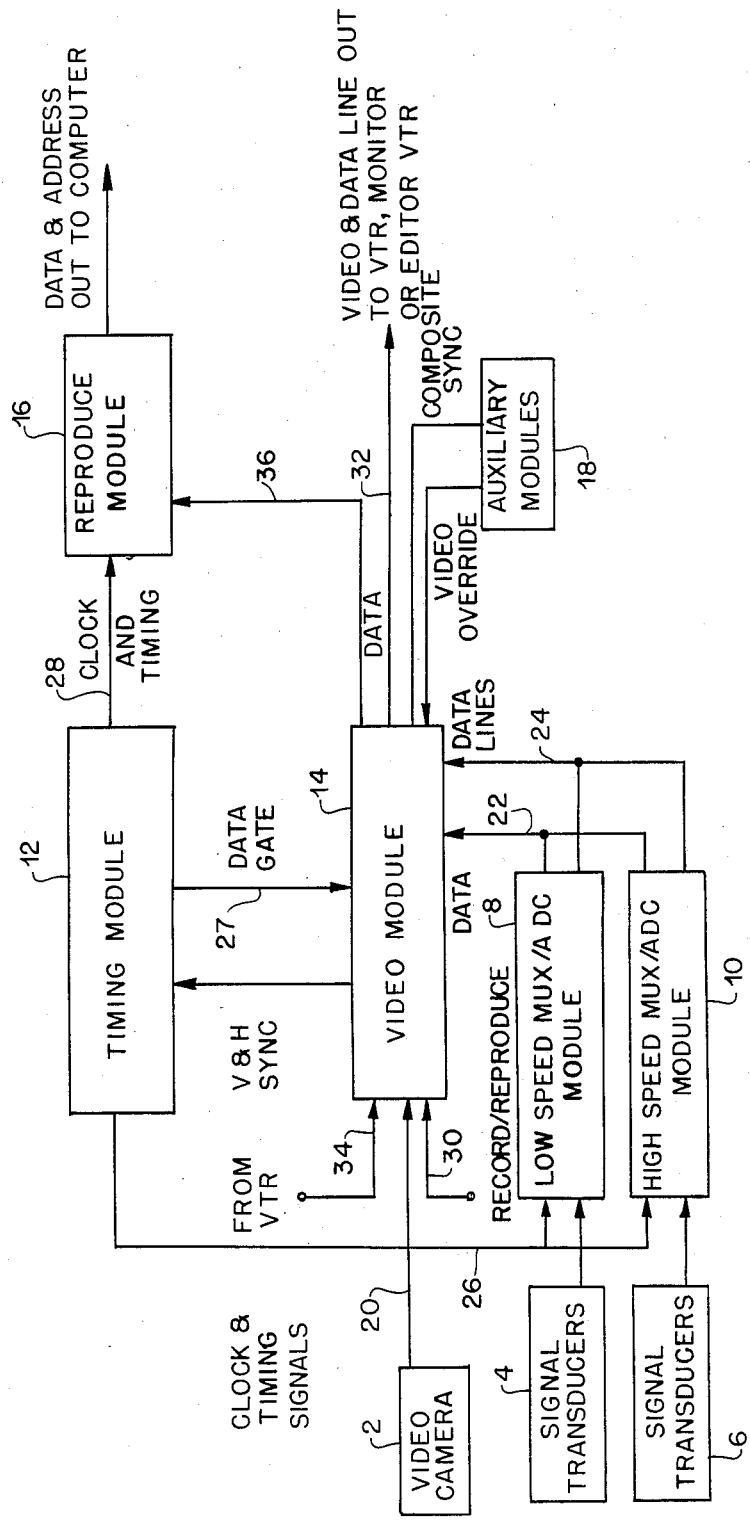
FIG. 3 is a block diagram serving to schematically illustrate a preferred embodiment of the real time video data acquisition system according to the instant invention.
Figure 9:
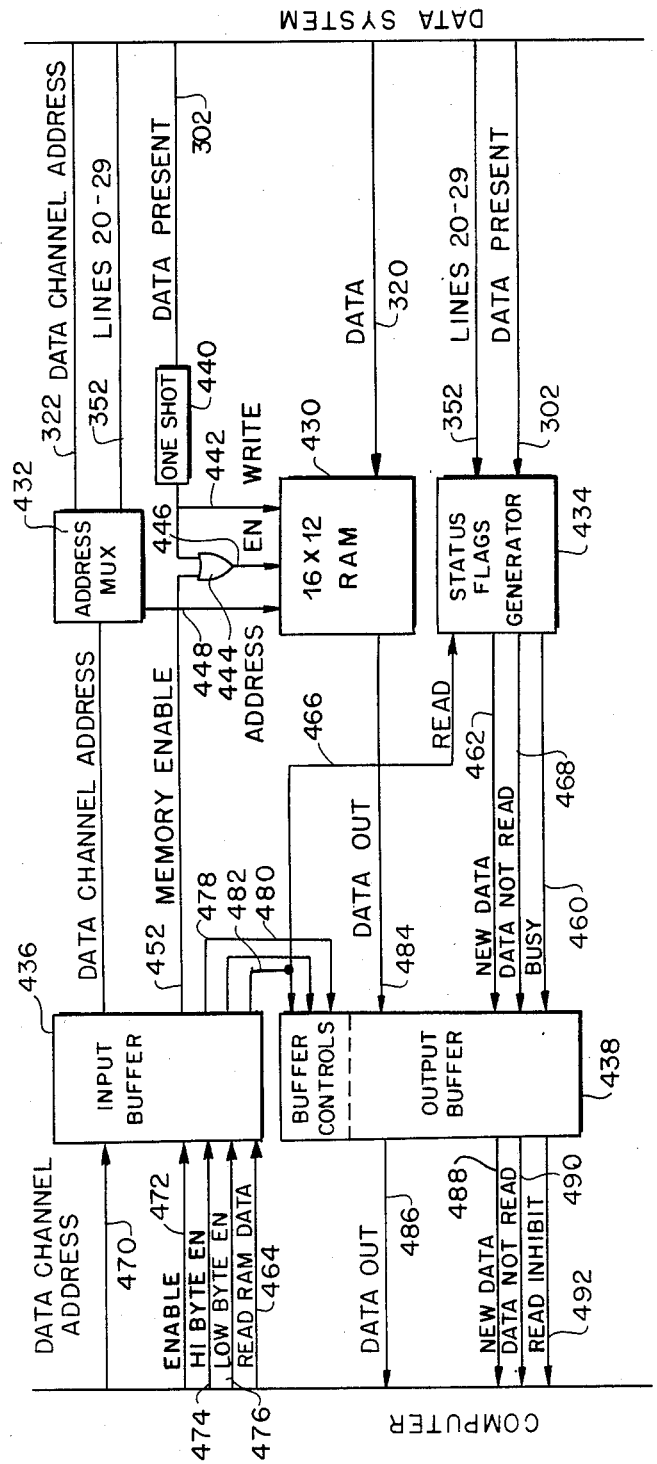
FIG. 9 is a block diagram schematically illustrating an exemplary auxiliary module in the form of a RAM buffer suitable for use in the embodiment of the invention illustrated in FIG. 3.
Figure 10:
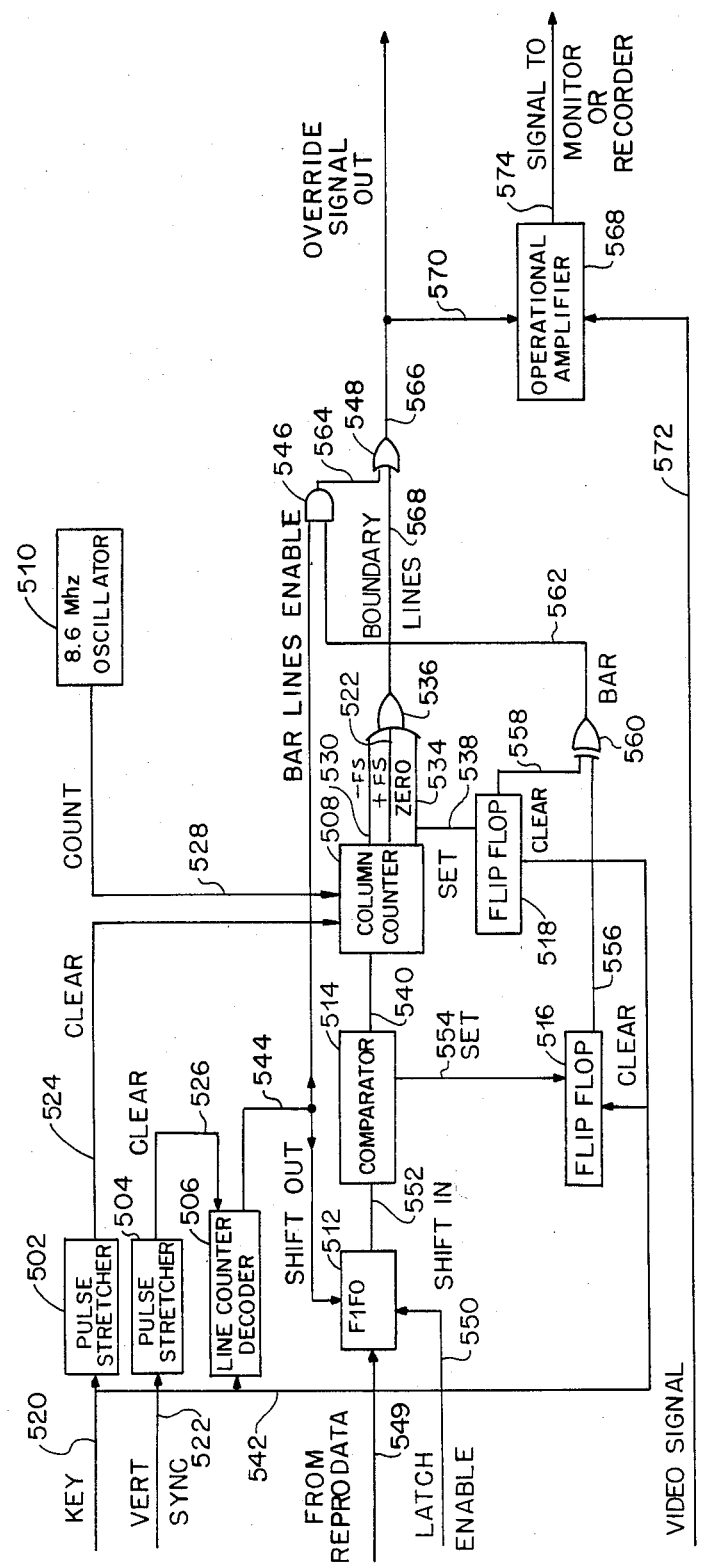
FIG. 10 is a block diagram schematically illustrating an exemplary embodiment of an auxiliary module in the form of a bar graph generator suitable for use in the embodiment of the invention illustrated in FIG. 3.
Figure 12:
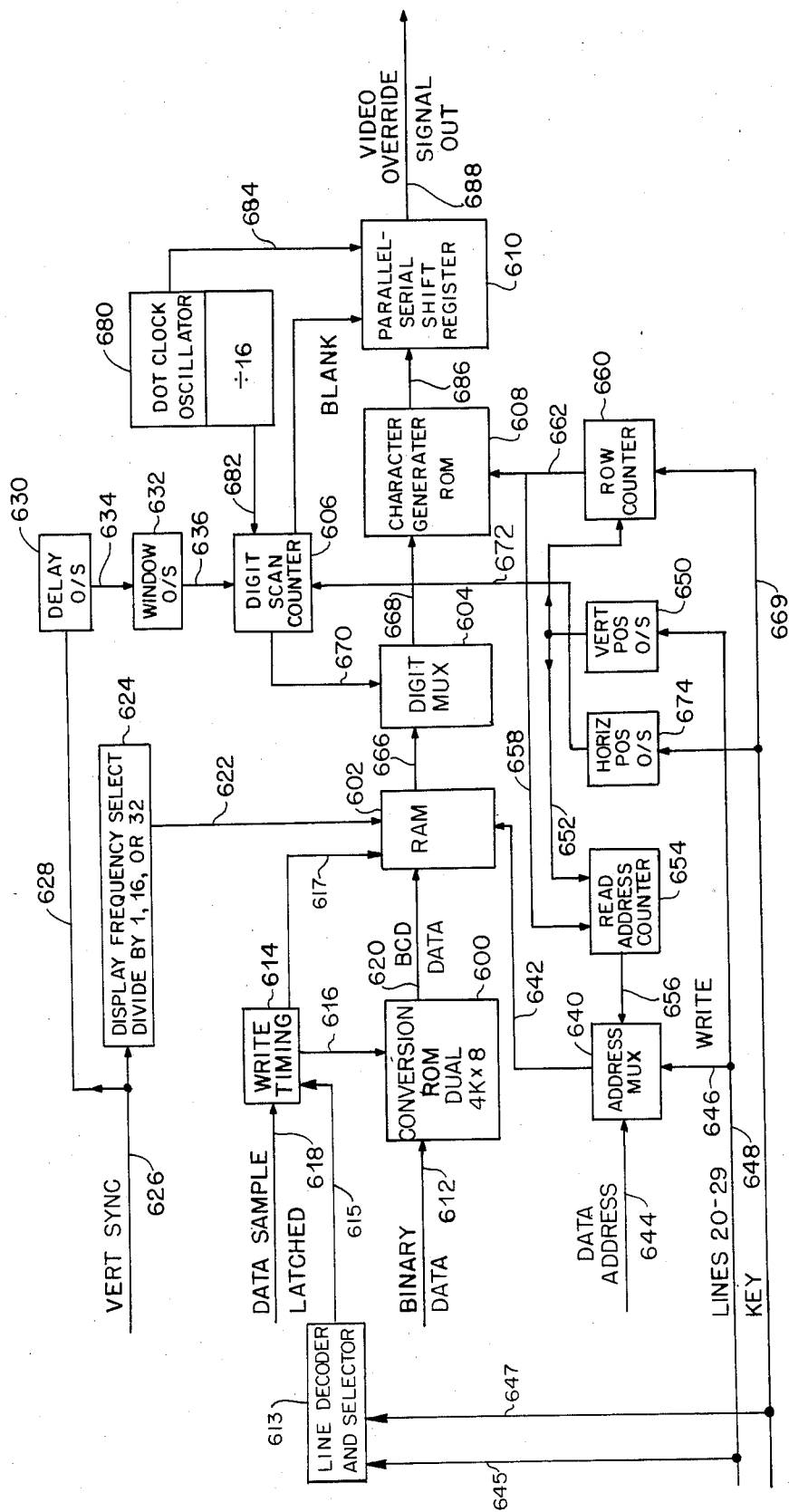
FIG. 12 is a block diagram schematically illustrating an exemplary embodiment of an auxiliary module in the form of a numeric display generator suitable for use in the embodiment of the invention illustrated in FIG. 3.

Referring now to FIG. 3 there is shown a block diagram serving to schematically illustrate a preferred embodiment of the real time video data acquisition system according to the instant invention. The preferred embodiment of the real time video data acquisition system according to the instant invention, as illustrated in FIG. 3, comprises a video camera input 2, signal transducer array inputs 4 and 6, low speed multiplexer A to D converter module 8, high speed A to D converter module 10, timing module 12, video module 14, reproduce module 16 and auxiliary modules 18 such as a buffer module, as shown in FIG. 9, a bar graph generator, such as illustrated in FIG. 10 and a numeric display generator, such as illustrated in FIG. 12.

The video camera input 2 may take any of the conventional forms of video camera apparatus compatible with NTSC video signal formats as currently employed within the United States. Video camera input 2, as will be appreciated by those of ordinary skill in the art, will provide a conventional video signal to the video module 14 through cable 20 in the same manner as a video input would be provided to a conventional video tape recorder. In the case of the vehicle testing application described above, the video camera 2 would typically be mounted behind the driver of the vehicle so that the driver's view would be recorded thereby and any statements made by the driver or sounds occurring in the vehicle would be recorded as well.

The signal transducer array 4 may comprise any number of transducers such as potentiometers, accelerometers, gyroscopes, tachometers or the like employed as low speed sensors to monitor conditions such as velocity, steering angle, roll rates, acceleration, various pressures and the like. Each group of twelve low speed sensors are treated as separate array and would be connected to a separate low speed multiplexer A to D converter module 8. Data from each of the twelve low speed signal transducers within the signal transducer array 4 is first conditioned through the use of a conventional differential input instrumentation amplifier or the like which employs signal suppression, offset and calibration controls to appropriately obtain low noise signals having selected amplitudes. Each instrumentation amplifier is preferably followed by a multipole anti-aliasing filter and an output signal polarity reversal switch to condition the signal. Assuming a full twelve signal transducers are within the signal transducer array 4, all twelve signals would be applied in parallel to the low speed multiplexer A to D converter module 8.

Similarly, the signal transducer array 6 contains individual high-speed transducers or pairs of transducers wherein one high-speed multiplexer A to D converter module 10 will be required for each high-speed transducer or pair employed. Data from each single high-speed transducer 6 is sampled at a rate corresponding to one channel of 10 bits sampled sixteen times per field or alternatively two transducers providing two channels sampled eight times per video field and the signal therefrom digitized to 10 bits. Thus, up to twelve low-speed transducers may be employed per signal transducer array 4 and result displayed in a single data line as illustrated in FIG. 1. In addition, one or two high-speed signal transducers may be employed for each high-speed multiplexer A to D converter module 10. The instant invention may theoretically accommodate any number of lines of data per frame up to the number of horizontal lines in a frame; however, the present embodiment accommodates only ten such lines of data at the very top of the video frame. Therefore, ten low-speed signal transducer arrays 4, each comprising up to twelve transducers, may be utilized, ten high-speed signal transducer arrays 6, may be employed or some combination thereof which results in no more than ten lines of data in the frame reproduced.

The low-speed multiplexer A to D converter module 8 is described in greater detail in connection with FIG. 4. Here, however, it is sufficient to appreciate that each of the twelve inputs thereto are multiplexed and sampled at field frequency and digitized. Once the same have been digitized the digitized words are stored in a first in, first out memory. At a selected horizontal line, a resistor coded sync word followed by the data words are clocked out serially to the video module 14 through cable 22. Timing information to control a video/digital data selector switch within the video module 14 is provided from the low-speed multiplexer A to D converter module 8 to the video module 14 through the conductor 24.

Similarly, the high-speed A to D converter module 10 is described in greater detail in connection with FIG. 5. Here it is sufficient to appreciate that the one or two high-speed inputs thereto are multiplexed and sampled at sixteen times or eighteen times field frequency and digitized. Here parallel, digital words are again stored in a first in, first out memory. At the occurrence of the selected horizontal line which, as shall be seen below, is one of lines 20–29, a resistor coded sync word followed by the data words are clocked out serially to the video/digital data selector switch in the video module 14 through cable 22. Data on conductor 24 is again employed to control the video/digital data selector switch within the video module 14. The video/digital data selector switch effectively acts as a gate to apply either video information from video camera 2 or digital information corresponding to instrument readings to the output of the video module 14 to superimpose the digital information in the form of a data line on the video in the manner shown in FIG. 1. This information is subsequently applied to the video tape recorder, a monitor, a transmitter or an editor video tape recorder for subsequent use.

The timing module 12 is described in greater detail in connection with FIG. 8. Here it is sufficient to appreciate that the timing module 12 is designed to track speed variations in a video input by slaving the clock to the video horizontal frequency. A ramp sample and hold type of phase locked loop is employed to maintain the average clock frequency at 208 times the horizontal frequency. The phase locked loop has a bandwidth which is sufficient to track even very large and rapid speed fluctuations. However, any phase error at the detector causes a clock phase error 208 times greater and any clock frequency jitter is averaged over 208 clock periods by the phase detector. For this reason the clock itself is phase corrected by the trailing edge of the horizontal sync signal during record and reproduce modes and during the reproduce mode every 1/0 transition in the reproduced data, phase-corrects the reproduce clock. Clock and timing information from the timing module 12 are supplied in a manner to be developed in greater detail below to the low and high speed multiplexer A to D converter modules 8 and 10 as is signal information employed to identify horizontal lines 20-29. This information is also applied to the video module 14 through the conductor 27 where the same are employed to gate data and to the reproduce module 16 through the conductor 28 where the same are utilized to control the latching and shifting of data.

The video module 14 receives video information from video camera 2 and lines of data from the low and/or high speed multiplexer A to D converter modules 8 and 10. In response the video module 14 provides composite video information to the output buffer thereof for application to a video recorder, monitor, transmitter or editor VTR including the display illustrated in FIG. 1 to be produced. More particularly, the video signal from the video camera 2 is gain controlled, clamped and scaled forcing its maximum (white) signal to be equal to a logic ONE voltage and its minimum video (black) signal to be equal to a ZERO logic voltage. This conditioned video signal is normally applied to the video/digital selector switch within the video module 14. The video/digital selector switch normally feeds the video signal to its output buffer. However, during the visible portion of any data line, the digital data present at the input to the video/digital selector switch is selected. Since this data is presented on a coincident basis with the presence of selected ones of horizontal lines 20-29, the resulting information provided to the output buffer will correspond to a video frame having the requisite instrument readings overlaid within appropriate horizontal lines thereof to create the video data line display illustrated in FIG. 1. The video/digital data switch within the video module 14 is activated only during a record mode. In the reproduce mode it is disabled so that only the video signal can be selected.

The video module 14 receives a record/reproduce switch input on conductor 30 for purposes of placing the system in a record or reproduce mode and hence controlling the enabled or disabled condition of the video/digital selector switch within the video module 14 as aforesaid. In a record mode, video information from video camera 2 and measurement instrument information from signal transducer arrays 4 and 6 are formatted into composite signals for recording on a video tape recorder, being displayed on a monitor and/or being transmitted as indicated by the output line 32. In the reproduce mode, video information already recorded on a video tape recorder is input to the video module as indicated by the input annotated 34 so that the same may be provided to the reproduce module 16 through data lines 36 and output to a monitor, editor VTR or transmitter.

The reproduce module 16 shall be described in greater detail in connection with FIG. 7. In essence, within the reproduce module 16 the output of a data separator present within the video module 14 is clocked into a serial in, parallel out shift register having a sufficient length to hold the sync word plus one data word. If the sync word favorably compares with a resistor derived sync code, the first data word is latched into the output and a bit counter/word counter pair is enabled. When the number of clock pulses equals the length of the data word, the content of the shift register is latched into the output, the word counter is incremented and the bit counter reset. When the last word of the data block is latched into the output, the entire reproduce module is reset. The reproduce module 16 presents the data in bit parallel, word serial form, with each word accompanied by a multiplexer address or a sample number. The data appears in a burst mode in which a data block is decoded entirely during 45 microseconds of one video line. The data thus presented can be used through a parallel input port of a properly programmed digital computer or it may be reformatted into any of several useful forms by means of auxiliary modules 18.

In actuality, a low-speed reproduce module and a high-speed reproduce module are both present and connected in parallel but are responsive to different 12 bit sync codes. The high-speed reproduce module is identical to the low-speed module except that the bit counter counts only to 10, the address counter counts to 16 and only the 10 most significant bits of the data latch are used. During a record mode, the reproduce module reads what is being recorded on a video tape recorder, being transmitted or being supplied to a monitor. During the reproduce mode, the reproduce module reads what is being read from the video tape recorder and supplied to the video module on input 34.

While a number of auxiliary modules 18 are available for use with the instant invention, only three such modules are specifically disclosed herein in connection with FIGS. 9, 10 and 12. In FIG. 9, a RAM buffer module is disclosed which loads the burst mode data obtained from the reproduce module 16 into a RAM which, when connected to a computer's parallel input port, appears to the computer as a read only memory which is revised each 1/60th of a second. In FIG. 10, a bar graph display module is described which acts to convert the output of the low-speed reproduce module into a 12 channel bar graph display which is overlaid on the video picture in the manner shown in FIG. 11. In FIG. 12, a numeric display module is disclosed which converts the output of the low-speed reproduce module into numerical form ranging from +1000 to −1000. These numerals are displayed as a vertical column of numerals overlaid on the video picture in the manner illustrated in FIG. 2. The numerics can be updated 60 times per second, for stop action or slow motion reproduce modes, or they can be updated at 1/16th or 1/32 of the field rate for better visibility in normal speed reproduce modes.

Figure 4:
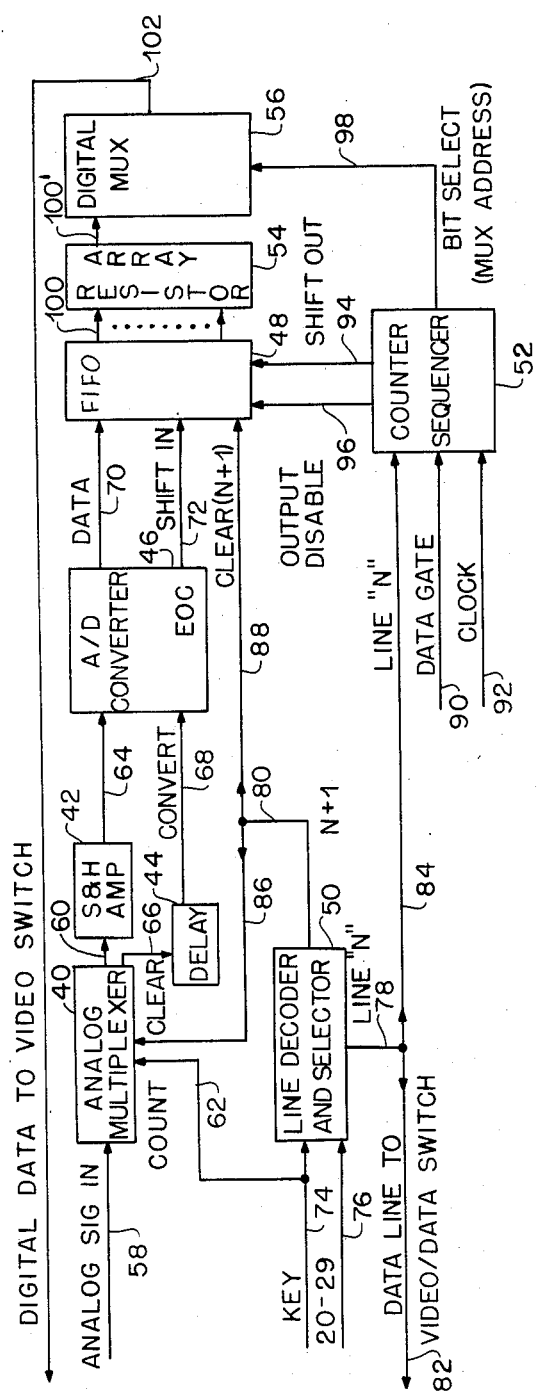
FIG. 4 is a block diagram illustrating an exemplary embodiment of a low speed A to D converter module for use in the embodiment of the invention illustrated in FIG. 3.

Turning now to FIG. 4, there is shown a block diagram schematically illustrating an exemplary embodiment of a low speed A to D converter module for use in the embodiment of the invention illustrated in FIG. 3. The exemplary embodiment of the low speed A to D converter module illustrated in FIG. 3 comprises an analog multiplexer 40, a sample and hold amplifier 42, delay element 44, A to D converter 46, FIFO (first in, first out) memory 48, line decoder and selector 50, counter sequencer 52, resistor array 54 and a digital multiplexer 56. The input to the analog multiplexer 40, indicated by the conductor 58 annotated Analog Signal In serves as the input to the embodiment of the low speed multiplexer A to D converter module illustrated in FIG. 4. As such, the input to the analog multiplexer 40 indicated by the conductor 58 will typically comprise 12 input data line pairs, each pair representing the output of one signal transducer within the signal transducer array 4 illustrated in FIG. 3. Each signal from a transducer, as aforesaid, has been conditioned and filtered subsequent to amplification to bring it to a predetermined gain level.

The analog multiplexer 40 may take any of the well known forms of this conventional class of device and acts to sequentially apply each of the 12 inputs thereto to the single output thereof on conductor 60 in sequence at a rate determined by the count signals applied thereto on conductor 62. The signal annotated Key applied to conductor 62 is generated by the video module illustrated in FIG. 6 and in essence is a pulse which is generated once per video line. As applied to the analog multiplexer 40, each successive key pulse advances the analog multiplexer until 12 channels have been sampled in addition to channel 0 to which the same is reset. The analog multiplexer 40 address is then held until resetting occurs on the next video field.

The output of the analog multiplexer 40 is applied through the conductor 60 to the sample and hold amplifier 42. This analog output will thus represent the level of the transducer channel for which the analog multiplexer 40 is set within the group of 12 channels applied to the input thereto on conductor 58. The sample and hold amplifier 42 may take any of the conventional forms of this well known class of device and hence acts to sample, at a predetermined rate, the analog data applied to the input thereto on conductor 60 and to hold the same at the output thereof connected to conductor 64 until the next sampling interval. The output of the analog multiplexer is also applied through conductor 66 to the input of the delay element 44. The delay element 44, which may be a conventional one shot or the like, acts to insert a predetermined delay in the signal applied thereto on conductor 66 and to apply its output through the conductor 68 to the A to D converter 46.

The A to D converter 46 may take any of the well known forms of this conventional class of device and acts in the conventional manner to transform the sampled analog input supplied thereto on conductor 64 into a digital signal which here comprises 12 bits. Thus, after a settling delay provided by the delay element 44, the sampled analog signal on conductor 64 is digitized into 12 parallel bits, and presented at the output of the A to D converter 46 as 12 parallel bits within the output cable 70. While individual elements may be employed for the analog multiplexer 40, the sample and hold amplifier 42, the delay element 44 and the A to D converter 46, the same may simply be configured from an MP6812 data acquisition system chip as available from Analogic Corporation of Wakefield, Massachusetts.

After each conversion of a sampled analog signal representing a transducer output, the 12 parallel bits resulting from such conversion as produced by the A to D converter 46 is shifted into the FIFO memory 48. The FIFO memory 48 may take any conventional form in an embodiment of the invention which was actually built and tested, the same was formed from three CD40105 four bit by sixteen word FIFO register chips as available from RCA. Thus each 12 bit output of the A to D converter 46 is shifted in parallel into a word location of the FIFO memory 48, it being appreciated by those of ordinary skill in the art that the A to D converter 46 will generate a shift signal on conductor 72 upon the completion of each 12 bit conversion.

The once per video line Key signal applied to the analog multiplexer 40 through conductor 62 is also applied to the line decoder and selector 50 through the conductor 74. The Key signal, it will be recalled, is generated by the video module illustrated in FIG. 6. In addition, a 20-29 input is applied through the conductor 76 to the line decoder and selector 50. The 20-29 signal is a pulse which is generated in a manner to be described in conjunction with the system timing module illustrated in FIG. 8. Here it is sufficient to appreciate that the signal applied on conductor 76 to the line decoder and selector 50 is a pulse which goes low and remains low through video lines 20-29 which are the arbitrary lines at the top of the picture which have been selected for the insertion of the maximum 10 data blocks which may be employed in connection with the real time data acquisition system according to the instant invention.

The line decoder and selector 50 may take the conventional form of a counter such as a 74HC4017 counter chip available with 10 decoded outputs from National Semiconductor Corporation. The line decoder and selector 50 acts, as will be readily appreciated by those of ordinary skill in the art, to determine which arbitrary one of the 10 video lines (20-29) the data associated with this particular low speed A to D converter module is to be inserted in. Those of ordinary skill in the art will appreciate that since the key signal occurs once during each video line and the 20-29 signal occurs for the 10 video line sequence, the counter chip within the line decoder and selector 50 need only count key pulses which occur during the 20-29 interval until the preselected count associated with a particular A to D converter module such as illustrated in FIG. 4 occurs. At that juncture, a line N output will be produced on conductor 78 and upon the occurrence of the next key signal on conductor 74 a line N+1 signal will be produced on conductor 80. The line N output produced by the line decoder and selector 50 identifies the line onto which digital data is to be inserted for the particular low speed 12 channel A to D converter module and is applied as an enable signal to the video data switch in the video module illustrated in FIG. 6 as indicated by the conductor 82. In addition, this signal as indicated in FIG. 4 is applied to the counter sequencer 52 where the same is employed in the generation of the output thereof. The N+1 output of the line decoder and selector 50, as applied to the conductor 80, is further applied to the conductors 86 and 88 where the same is utilized to reset the address of the analog multiplexer 40 to Channel 0 and to Clear the FIFO memory 48.

Clock and Data Gate signals are also applied to the counter sequencer 52 on conductors 90 and 92. Both the Data Gate and Clock signals are generated by the timing module illustrated in FIG. 8 and will be further described in connection therewith. In essence, here it is sufficient to appreciate that the Data Gate signal on conductor 90 goes high at the end of the color burst and remains high for approximately 50 microseconds on each horizontal line. The Clock and Data Gate signals from the timing module are employed with the Data Line N signal on conductor 84 to cause the counter sequencer 52 to clock parallel digital data from the FIFO memory 48 into the digital multiplexer 56 which here acts as a parallel to serial converter. To this end signals generated by the counter sequencer 52 are applied through the conductor 94 to the FIFO memory 48 while enable/disable signals are applied thereto through the conductor 96.

Bit select signals for the digital multiplexer 56 are applied thereto by the counter sequencer 52 through the cable 98. The Bit Select signals applied by the counter sequencer 52 to conductor 98 may take the form of a four bit multiplexer address. The counter sequencer 52 may be formed by a conventional counter arrangement. Thus, for instance, the counter sequencer 52 may be formed by a synchronous binary counter such as a 74HC161, a counter with ten decoded outputs such as the 74HC4017, together with an OR gate and NAND gate array which may take the form of a 74HC32 and a 74HC00 wherein each of these chips is available from National Semiconductor Corporation.

The resistor array 54 may take the conventional form of individual resistors connected between the 12 parallel outputs of the FIFO memory 48 and either ground or a 5 volt level to thus form an arbitrary Sync Code in the conventional manner. The FIFO memory 48 in the form of FIFO registers, as aforesaid, is a tristate device which has a high impedance output when deselected. The FIFO memory 48 is deselected for a data channel zero condition (N+1) so that under such conditions the resistor array 54 is connected to its output lines to establish selective levels of 5 volts or ground thereon to form an arbitrary Sync Code. When the FIFO memory 48 is selected during data channels 1–12, the effect of the resistor array is overcome and data is presented to the digital multiplexer 56 through output cables 100 and 100' which represent 12 output conductors in parallel.

The digital multiplexer 56 may take the conventional form of a parallel to serial converter which acts to convert the 12 digital inputs applied in parallel to the input thereof on cables 100 and 100', to a 12 bit serial output which is applied to output conductor 102. Here the individual ones of the twelve bit inputs are selected on the basis of the bit select address supplied on cable 98. The digital multiplexer 56 may be formed by a pair of 74HC251 8-channel multiplexer chips as available from National Semiconductor. The output of digital multiplexer 54 as indicated is applied through the conductor 102 as serial digital data to the video switch present in the video module illustrated in FIG. 6.

In operation of the low speed A to D converter module illustrated in FIG. 4, it will be appreciated that 12 input data line pairs are connected to the analog multiplexer 40 through the cable 58 wherein each of the 12 inputs typically represents a signal transducer within the signal transducer array 4 illustrated in FIG. 3. The timing signals applied from the system timing module illustrated in FIG. 8 are the Key Pulse applied to conductors 62 and 74, which occurs once per video line, and a 20–29 pulse which remains low during the presence of lines 20–29.

If it is assumed that the analog multiplexer 40 was previously reset by the line N+1 pulse generated by the line decoder and selector 50, the same will currently be addressed to channel 0. With each successive Key pulse applied to conductor 62, the analog multiplexer 40 will advance to apply one of the 12 inputs on conductor 58 to the output thereof on conductors 60 and 66. Each output applied to conductor 60 is acted upon in the conventional manner by the sample and hold amplifier 42 and applied to the A to D converter 46 through conductor 64. Once successive Key pulses have advanced the analog multiplexer 40 through all 12 channels in addition to channel 0, the multiplexer address is held until reset by the next video field. After settling time delay, as inserted by the delay unit 44, the sampled analog signal is digitized into 12 parallel bits by the analog to digital converter 46. At the end of each conversion, data is shifted into the 12 bit FIFO memory 48.

The Key and 20–29 signals are decoded into individual line signals, i.e. the selected one of lines 20–29, by the line decoder and selector 50. The line N output on conductor 78, representing the line into which this digital data is to be inserted, is selected and supplied as an enable signal to the Video Data Switch in the video module illustrated in FIG. 6. In addition, the line N signal is supplied through conductor 84 to the counter sequencer 52. The N+1 signal generated by the line decoder and selector on conductor 80 upon the next occurrence of a Key pulse on conductor 74 is employed to reset the analog multiplexer address to channel 0 and to clear the FIFO memory 48. Data gate and clock signals applied to conductors 90 and 92 from the system timing module illustrated in FIG. 8 are used together with the Line N signal on conductor 84 to clock the parallel digital data from the FIFO memory 48 into the digital multiplexer unit 56 which acts as a parallel to serial converter and to output to the video module illustrated in FIG. 6 serialized digital information on conductor 102 for insertion into the video signal on a selected line. Because the FIFO memory 48 is a tristate device having a high impedance when deselected on data channel 0, the FIFO memory 48 is deselected and the resistor array 54 acts to insert a 12 bit sync word in the form of an arbitrary sync code as the first data word to be supplied in parallel to the digital multiplexer 56. Thereafter, the remaining 12, 12 bit words associated with the 12 multiplexed data channels supplied on the cable 58 to the analog multiplexer 40 are read out in series on conductor 102 for application as digital data to the video switch within the video module in the manner indicated by the annotation on conductor 102.

The FIFO memory 48 is emptied on the occurrence of a Line N signal by a signal generated by the counter sequencer 52 on conductor 94. It is cleared on the occurrence of an N+1 signal on conductor 88 and it is refilled on the lines following N+1. The digital multiplexer 56 also acts as a tristate device which is enabled only during the presence of a bit select signal on conductor 98. The Digital Data applied on conductor 102 to the video switch in the video module illustrated in FIG. 6 can therefor be timeshared with several low speed 12 channel A to D converter modules such as illustrated in FIG. 4 wherein each such module would employ a different video line N.

Figure 5:
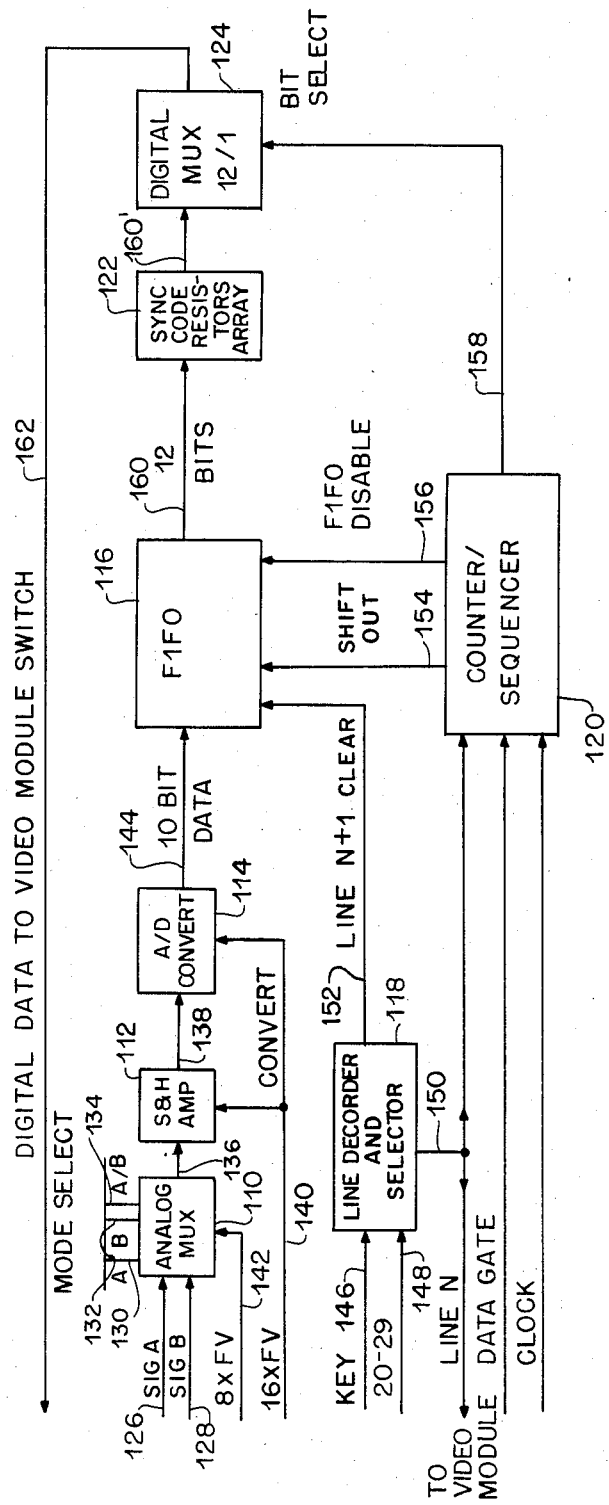
FIG. 5 is a block diagram schematically illustrating an exemplary embodiment of a high speed A to D converter module suitable for use in the embodiment of the invention illustrated in FIG. 3.

Referring now to FIG. 5 there is illustrated a block diagram schematically showing an exemplary embodiment of a high speed A to D converter module suitable for use in the embodiment of the invention illustrated in FIG. 3. Such a high speed A to D converter module is illustrated in FIG. 3 as element 10. The embodiment of the high speed A to D converter module illustrated in FIG. 5 is configured in much the same manner as the low speed A to D converter module illustrated in FIG. 4 and includes an analog multiplexer 110, a sample and hold amplifier 112, an A to D converter 114, a FIFO memory 116, a line decoder and selector 118, a counter sequencer 120, a resistor array 122 and a digital multiplexer 124. The high speed A to D module illustrated in FIG. 5 functions in much the same manner as the low speed analog to digital converter module illustrated in FIG. 4 with the exception of the initial data receiving stages thereof which, as will be appreciated by those of ordinary skill in the art, must be responsive to less data, i.e. information from one or two transducers which is sampled at a higher rate.

The analog multiplexer 110 may comprise an analog switch such as a IH5043 analog switch as available from Intersil. The analog multiplexer 110 may receive a first signal input on conductor 126 which may be sampled 16 times per video field or a second channel of information may be applied thereto on conductor 128 so that the two channels (A and B) then present may be sampled 8 times per video field. The mode select inputs to the analog multiplexer 110 indicated in FIG. 5 are applied to conductors 130, 132 and 134. These select inputs allow the analog multiplexer 136 to be switch selected to sample only channel A, only channel B or channel A and B alternatively. Hence the levels applied to conductors 130, 132 and 134 would strictly be a function of the selection to be carried out by the analog multiplexer 110 as a result of the one or two high speed transducers connected to this particular high speed A to D converter module. The output of the analog multiplexer 110 is applied through conductor 136 to the sample and hold amplifier 112.

The sample and hold amplifier 112 acts in the conventional manner to sample input information applied thereto on conductor 136 and hold the same for application through conductor 138 to the A to D converter 114. The sampling rate of the sample and hold amplifier 112 is controlled by the signal 16XFV applied to conductor 140 which occurs 16 times per video field and is produced by the timing module illustrated in FIG. 8. An 8XFV sampling rate signal which occurs 8 times per video field is also produced by the timing module illustrated in FIG. 8 and supplied to the analog multiplexer 110 through conductor 142. The output of the sample and hold amplifier 112 is supplied through conductor 138 to the A to D converter 114.

The A to D converter 114 may take any of the conventional forms of this well known class of device and acts to convert analog signal information applied thereto into 10 bit digital data. As such, the analog to digital converter 114 may take the form of an AD571 10 bit A to D converter such as is available from Analog Devices. The 16XFV signal applied to conductor 140 is also applied to the A to D converter 114 in the manner shown. Thus, the output of the analog multiplexer 110 is sampled and digitized 16 times per second in such manner that when the 16XFV signal is high, data is sampled by the sample and hold amplifier 112 and when this signal goes low the sample is held and digitized. At the end of each conversion, 10 bits of parallel information as present at the output of the analog to digital converter 110 are applied through cable 144 to the FIFO memory 116.

The FIFO memory 116 illustrated in FIG. 5 may take precisely the same form as the FIFO memory 48 disclosed in connection with FIG. 4. It may thus be formed of three 4 bit by 16 word FIFO registers such as may be formed by parallel connection of three CD40105 FIFO register chips such as is available from RCA. Unlike the case of FIG. 4, where 12 bits in parallel were supplied to the FIFO memory 48, only 10 bits of parallel information are provided by the output of the A to D converter 114 on cable 144. Under these circumstances, 2 bits of each word formed in the FIFO memory 116 are grounded and unused.

The line decoder and selector 118 and the counter/sequencer 120 may each correspond identically to the line decoder and selector 50 and the counter sequencer 52 described in connection with FIG. 4 and each receives the same input information and performs the same function as was described in connection with FIG. 3. Thus, the line decoder and selector 118 may comprise a counter which receives Key signal information on conductor 146 and line 20–29 information on conductor 148 and provides line N information as an output on conductor 150 and line N+1 information on conductor 152 which is applied to Reset the random access memory 116. The line N information again defines the line into which the output digital data of this module is to be inserted and is supplied from conductor 150 to the Video/Data switch in the video module illustrated in FIG. 6 as well as to the counter sequencer 120. The line N+1 information decoded by the line decoder and selector 118 and applied to conductor 152 is supplied to the random access memory 116 to Clear the same.

In addition to the line N information provided by the line decoder and selector 118, the counter/sequencer 120 also receives Data Gate and Clock signals from the timing module. These signals, as was described in connection with FIG. 4 are employed together with the selected line N information to clock the parallel digital data from the FIFO memory 116 into the digital multiplexer 124. To this end, Shift signals and Disable signals are applied from the counter/sequencer 120 to the FIFO memory 116 through conductors 154 and 156 as illustrated in FIG. 5 while Bit Select information is supplied from the counter/sequencer 120 to the digital multiplexer 124 through the cable 158. The signals supplied by the counter/sequencer 120 to the conductors 154 and 156 as well as the cable 158 act in precisely the same manner as was described for the corresponding signals on conductors 94, 96 and cable 98 in FIG. 4.

Word information from FIFO memory 116 is supplied as 12 bits of parallel information (2 bits representing unused ground level information) through cables 160 and 160' to the digital multiplexer 124. The resistor array 122 may comprise the same resistor configuration as the resistor array 54 described in connection with FIG. 4 and thus corresponds to resistors connected to the parallel output lines of the FIFO memory 116 to ground or five volt levels to thus define an arbitrary sync code which would be different in content from one employed for another high or low speed module. Thus, when the FIFO memory 116 is deselected the high output impedance of this tristate device will cause the 12 bit sync code information presented by the resistor array 122 to be applied through the cable 161 to the digital multiplexer 124. However, when the FIFO memory 116 is selected 10 bit words read therefrom at a rate corresponding to shift signals supplied to the conductor 154 will be applied in parallel through cables 160 and 160' to the digital multiplexer 124.

The digital multiplexer 124 may take precisely the same form as the digital multiplexer 56 described in connection with FIG. 4. Thus the same acts in the well known manner to receive 12 or 10 bits of parallel information and translate the same into serial data in the order determined by the bit select information supplied thereto on conductor 158. The digital multiplexer may again be formed by two 74HC251 chips available from National Semiconductor which are 8 channel, 3 state devices. This, it will be recalled, permits several high and low speed A to D converter modules to be multiplexed for purposes of supplying digital data to the Video Switch. The output of the digital multiplexer 124 is supplied through conductor 162 to the video module illustrated in FIG. 6 in the manner indicated in FIG. 5.

Figure 6:
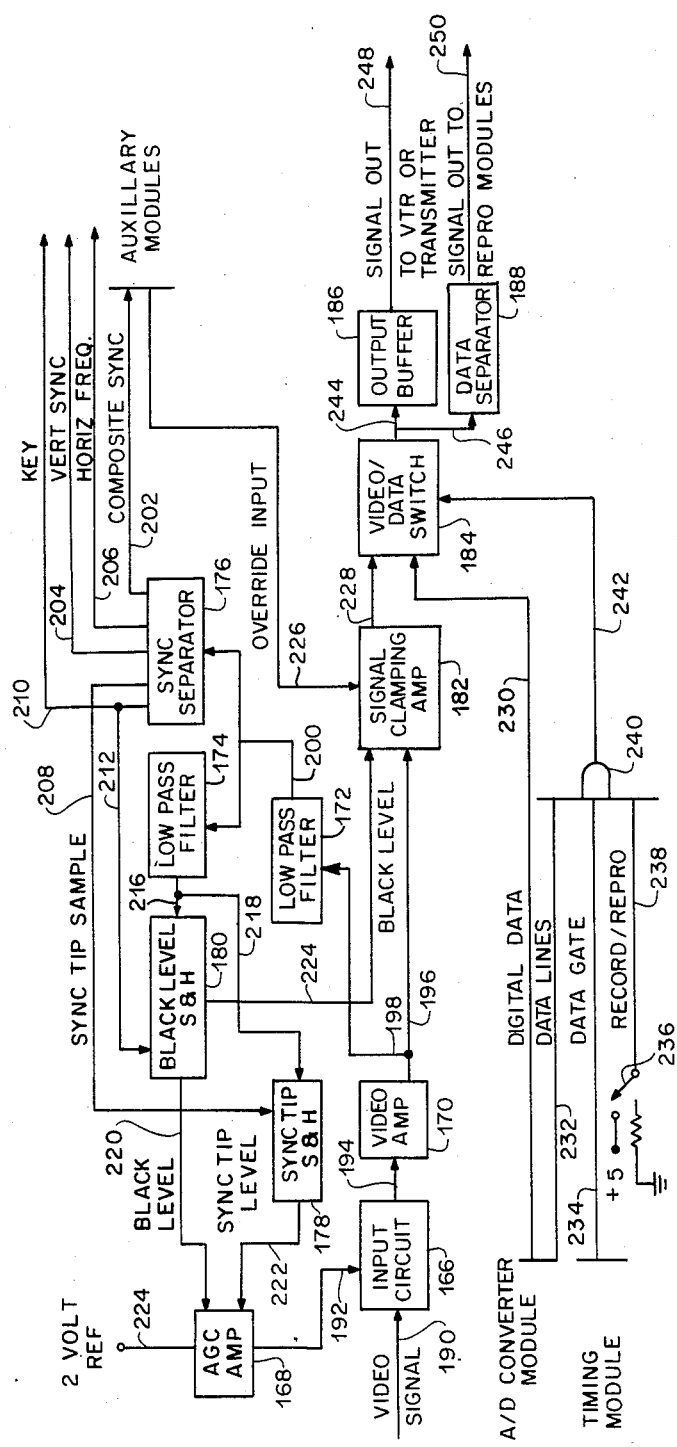
FIG. 6 is a block diagram schematically illustrating an exemplary embodiment of a video module suitable for use in the embodiment of the invention shown in FIG. 3.

Referring now to FIG. 6 there is shown a block diagram schematically illustrating an exemplary embodiment of a video module suitable for use within the instant invention. The exemplary video module illustrated in FIG. 6 comprises a video input circuit 166, an automatic gain control amplifier 168, a video amplifier 170, low pass filters 172 and 174, a sync separator 176, a sync tip sample and hold circuit 178, a black level sample and hold circuit 180, a signal clamping amplifier 182, a video/data switch 184, an output buffer 186 and a data separator 188.

The video input circuit 166 may be formed by a load resistor, coupling capacitor, clamping diode and a shunt photoresistor/light emitting diode unit. The video signal as developed by the video camera 2 illustrated in FIG. 3 is supplied to the video input circuit 166 through the conductor 190 as indicated. This signal, as shall be seen below, is gain controlled, clamped and scaled to make its maximum (white) signal approximately equal to a logic one voltage and its minimum video (black) signal approximately equal to a logic zero voltage. Once thus conditioned the video signal is fed to the video/digital selector switch 184.

The input circuit 166 also receives an input on conductor 192 from the automatic gain control amplifier 168. This input from the automatic gain control amplifier 168 serves to maintain the input voltage of the video signal present on conductor 194 at the required level. The automatic gain control amplifier may take the form of a conventional operational amplifier (Op Amp) and LED-photoresistor pair as available, for instance, as a VTL2C4 "Vactrol" chip from Vactec.

The output of the video input circuit 166 is applied through conductor 194 to the video amplifier 170. The video amplifier 170 preferably takes the form of an operational amplifier having a non-inverting closed loop gain of 15. A typical op-amp for this purpose is the HA2540 operational amplifier from Harris Corporation. The output of the video amplifier 170 is supplied through conductors 196 and 198 to the signal clamping op-amp 182 and the low pass filter 172. The low pass filter 172 preferably takes the form of a unity gain, non-inverting, operational amplifier 2 pole filter whose output is supplied through conductor 200 to the input of the sync separator 176 as well as to the low pass filter 174. The low pass filters 172 and 174 may be formed using op-amps such as the LF353 dual Op Amp such as available from National Semiconductor wherein one half of the chip forms each of low pass filters 172 and 174.

The sync separator 176 takes the form of an RC filter and comparator as well as a dual One Shot. The comparator may take the form of an LM319 dual comparator chip such as available from National Semiconductor while the dual One Shot may take the form of a 74HC221 dual One Shot chip also available from National Semiconductor. In essence, the output of the low pass filter on conductor 200 as applied to the sync separator 176 is applied through a capacitor and clamp diode to a comparator which acts in the conventional manner to separate out the Composite Sync. The Composite Sync signal is directly applied to one output of the sync separator 176 as indicated by the output 202. This signal is also integrated in the low pass RC filter within the sync separator and Vertical Sync is separated by a second comparator and applied to the conductor 204. One of the One Shots present within the sync separator 176 is triggered by the Composite Sync signal and exhibits a 45 microsecond period. This yields a Horizontal Frequency signal which is applied to conductor 206. The Horizontal Frequency signal thus produced on conductor 206 in the manner indicated in FIG. 6 has the advantage of being unaffected by equalization pulses.

A further One Shot present within sync separator 176 is triggered by the leading edge of the Composite Sync signal. This One Shot has a 4 microsecond period or duty signal and the output thereof is applied to conductor 208 for purposes of controlling the Sync Tip Sample-And-Hold circuit 178. A further One Shot within the sync separator 176 is triggered by the trailing edge of the Composite Sync (along with a noise gate signal) and has a period of 3.5 microseconds, which encompasses the color burst period. This Burst Key signal is applied to conductors 210 and 212 to be employed as the Key signal described earlier in connection with FIGS. 4 and 5 and in addition thereto is applied to the black level sample and hold circuit 180 wherein the same is utilized to sample the average black level of the video signal during the burst period.

The input to the black level sample and hold circuit 180 is supplied on conductor 216 from the second low pass filter 174. The second low pass filter 174 may again take the form of a two pole non-inverting operational amplifier low pass filter fed through the first low pass filter 172 over conductor 200. The output of the second low pass filter 174 is also supplied through conductor 218 to the input of the Sync Tip sample and hold circuit 178.

The output of the black level sample and hold circuit 180 is supplied through conductor 220 to the automatic gain control amplifier 168. Similarly, the output of the Sync Tip sample and hold circuit 178 is applied through conductor 222 to an input of the automatic gain control amplifier 168. A two volt reference voltage is also applied to the automatic gain control amplifier 168 through conductor 224. The difference between the sampled and held black level and the sampled and held Sync Tip level is obtained from the operational amplifier as aforesaid within the automatic gain control amplifier 168. The black level to Sync Tip level difference is compared to the two volt reference and the error is amplified and applied through conductor 192 to the input circuit 166 to drive the photoresistor/LED unit therein to control current through the LED and hence to keep the input voltage at the required level. Those of ordinary skill in the art will appreciate when the black level-sync tip difference is held at 2 volts, the standard white signal level will remain at 5 volts. Thus, when the Sync Tip level (−40 IRE units) is −2 volts, then +100 IRE units will be 5 volts.

The output of the video amplifier 170 representing the conditioned video signal, as aforesaid, which is gain controlled and scaled, is applied through the conductor 196 to the signal clamping amplifier 182. The signal clamping amplifier 182 also receives an input on conductor 224 representing the output of the black level sample and hold circuit 180. The signal clamping amplifier may take the conventional adder/subtracter form using an op-amp such as an HA2542 operational amplifier as available from the Harris Corporation. The signal amplifier 182 preferably has a unity gain and the black reference level applied thereto on conductor 224 is subtracted from the video signal applied on conductor 196. This, as will be readily appreciated by those of ordinary skill in the art, effectively clamps the black level exactly to ground making the white level 5 volts.

An override input as indicated on conductor 226 may also be applied to the clamping operational amplifier 182 from an auxiliary module such as the bar graph generator illustrated in FIG. 10. This override signal is preferably supplied through a gate so that it varies exactly between 0 and 5 volts. A logic one will therefore drive any video signal in the visible field to at least 5 volts and allows white alphanumeric or graphical data to be superimposed on the video picture. While not shown, a 5 volt clipping circuit may also be employed at the output of the signal clamping amplifier 182 connected to conductor 228 to eliminate any overdriving which may result from an override signal applied to conductor 226. The output of the signal clamping amplifier 182 is applied through the conductor 228 to the video/data switch 184.

The video/data switch 184 is preferably a high speed two input analog multiplexer which is controlled by the Record/Reproduce switch in conjunction with Data Gate signals supplied thereto from the timing module and Data Line signals from any active analog/digital converter module. The video/data switch 184 may take the form of an IH5341 video switch as available from Intersil. Digital Data from any active analog-to-digital converter module, such as illustrated in FIGS. 4 and 5, is applied thereto in the serial form described in connection with these figures on conductor 230. In addition, Data Line information developed from an active A to D converter module such as conductor 82 in FIG. 4 or the line annotated line N and connected to conductor 150 in FIG. 5 is applied to conductor 232 while Data Gate information developed at the timing module illustrated in FIG. 8 is applied to conductor 234. In addition, as also illustrated in FIG. 6, the condition of a Record/Reproduce switch 236 is applied to conductor 238. The switch 236, as will be readily appreciated from the conditions depicted in FIG. 6, will apply a 5 volt or a ground level to line 238 depending on whether the switch is in a Record or Reproduce condition. The levels on conductors 232, 234 and 238 are ANDed by the AND gate 240 and the high or low output condition of the AND gate 240 is supplied through conductor 242 to the video/data switch 184. When a high condition is present on conductor 242 the video/data switch 184 will act to insert digital data on conductor 230 into a video line. However, when a low level is present on conductor 242, and this occurs in every case where the Record/Reproduce switch 236 is set to a Reproduce condition, only video information will be gated through the video/data switch 184. Thus, the video/data switch 184 which is effectively a high speed two input analog multiplexer is controlled by the condition of the Record/Reproduce switch 236 in conjunction with the Data Gate signal from the timing module and Data Line signals from any active analog to digital converter. Thus, during a Record Mode at the time of occurrence of an active Data Line signal on conductor 232 the signal present on the Digital Data line which is active is switched to the output of the video/data switch 184 during the Data Gate period on conductor 234.

The output of the video/data switch 184 is supplied through conductors 244 and 246 to the output buffer 186 and the data separator 188. The output buffer may take the conventional form of an HA5033 video buffer such as is available from Harris Corporation and is employed as indicated in FIG. 6 to produce a composite output signal on conductor 248 for application to a video tape recorder, monitor or transmitter. The output of the video/data switch 184 is also applied through conductor 246 to the data separator 188. The data separator 188 is essentially an analog comparator having its threshold set at approximately 2.5 volts. This means that video or data signals at a level higher than the threshold will be applied to the output of the data separator 188 as logic Ones while signals below this threshold will be supplied to the output of the data separator as Zeros. The output of the data separator 188 is supplied to conductor 250 for application to the reproduce module illustrated in FIG. 7. The data separator 188 may take the conventional form of an LM361 comparator chip such as available from National Semiconductor.

Figure 7:
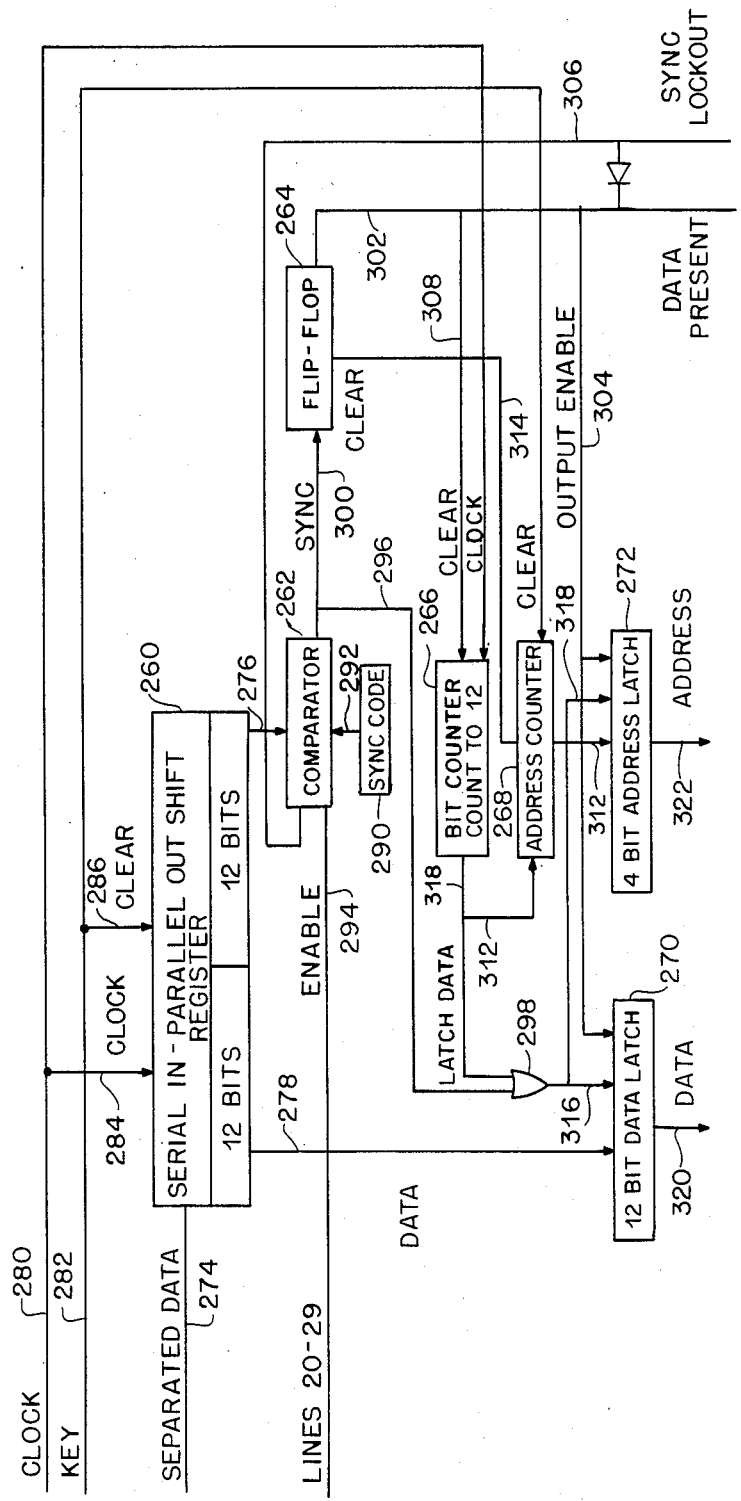
FIG. 7 is a block diagram schematically illustrating an exemplary embodiment of a reproduce module suitable for use in the embodiment of the invention illustrated in FIG. 3.

Referring now to FIG. 7 there is shown a block diagram schematically illustrating an exemplary embodiment of a reproduce module suitable for use in the instant embodiment of the present invention. The embodiment of the reproduce module illustrated in FIG. 7 comprises a serial-in/parallel-out shift register 260, a comparator 262, a data flipflop 264, a bit counter 266, an address counter 268, a 12 bit latch 270 and a 4 bit address latch 272.

The serial-in/parallel-out shift register 260 may take the conventional form of a 24 bit shift register wherein data supplied on conductor 274 is received in series and read out as 24 bits in parallel wherein the first 12 bits are read out on cable 276 while the remaining 12 bits are supplied to cable 278. Those of ordinary skill in the art will appreciate that each of cables 276 and 278 will comprise 12 conductors in parallel. The serial-in/parallel-out shift register 260 may conveniently be formed by three 74HC164 eight bit serial-in/parallel-out shift register chips, as available from National Semiconductor Corporation, connected to form a 24 bit device.

The separated data applied to conductor 274 is supplied, as will be appreciated by those of ordinary skill in the art, from the conductor 250 illustrated in FIG. 6 which serves as the output of the data separator 188. In this regard, it should be noted that when the video/record switch 36 illustrated in FIG. 6 is in the Record mode the video/data switch 184 shown in FIG. 6 is activated. In the Reproduce mode it is disabled, so that only the video signal can be selected. In the Record mode the video/data switch 184 normally feeds the video signal to its output buffer 186. However, during the visible portion of any data line, the digital data present at the switch input is selected instead so that the same appears as part of the resulting composite signal on conductor 248 and as plain data at the output of the data separator 188 whose output on conductor 250 is supplied to conductor 274 in FIG. 7 as serial data to be applied to the serial-in/parallel-out shift register 260.

The serial-in/parallel-out shift register 260 also receives, as plainly indicated in FIG. 7, Clock signals on conductor 280 and Key signals on conductor 282 which are applied to the Clock and Clear inputs, respectively of the serial-in/parallel-out shift register 260 through conductors 284 and 286. The Key signals, it will be recalled, are produced by the video module illustrated in FIG. 6 once per video line while the clock pulses are produced, as shall be seen below, by the timing module illustrated in FIG. 8. Thus, those of ordinary skill in the art will appreciate that the output of the data separator illustrated in FIG. 6 is applied through conductor 274 and clocked into the serial-in/parallel-out shift register 260 which has a length appropriate to hold the Sync word plus one data word. The first 12 bits loaded into the shift register 260 are applied through the cable 276 to the comparator 262 while the second 12 bits therein are applied through cable 278 to the 12 bit data latch 270. As it will be recalled that each line of data comprises a 12 bit Sync word inserted by the resistor array 54 as illustrated in FIG. 4 followed by twelve, 12 bit data words, the first 12 bits of a line loaded into the serial-in/parallel-out shift register 260 will comprise the Sync word while the second 12 bits will comprise the first data word.

The comparator 262 may take the form of a conventional 12 bit magnitude comparator which may conveniently comprise three 74HC85-4 bit magnitude comparator chips such as available from National Semiconductor. The second input to the comparator 262 is supplied from the Sync Code generator 290 through a 12 bit cable 292. The Sync Code generator 290 will supply the same form of resistor derived Sync Code to the comparator that was applied to each line of data in the high and low speed A to D converter modules discussed in connection with FIGS. 4 and 5. It should also be noted that if the instant reproduce module is serving more than one low speed module only a common portion of the Sync Code may be supplied by the sync code generator 290, and further decoding of line "N" as performed by 50 in FIG. 4 is required for each ultimate receiving device.

Even though a 12 bit Sync Code is employed as aforesaid, there is a small probability of a false Sync signal being generated by the comparator 262 as a result of random video signal fluctuations or by noise. To further reduce this possibility, an enable signal is applied to the comparator 262 on conductor 294 only during the interval when horizontal lines 20-29 are present. Thus, the comparator 262 is only enabled to perform its function during the presence of one of the ten lines of horizontal information in which data may be present. The line 20-29 signal is generated in a manner to be described in connection with the system timing module illustrated in FIG. 8. Perfect protection against inadvertent sync can be provided by each ultimate receiving device accepting data only for its respective line "N".

The comparator 262 acts in the well known manner to compare the 12 bit code applied thereto by the serial-in parallel-out shift register 260 on conductor 276 to the Sync Code applied on cable 292 from the Sync Code generator 290. When a comparison is obtained, the output of the comparator 262 will go high to indicate the presence of a proper Sync Code. The high output of the comparator 262 is applied through conductor 296 to the OR gate 298 and through conductor 300 to the flip-flop 264. Thus, separated data is continuously clocked into the 24 bit serial-in/parallel-out shift register 260 and the leading 12 bits therein are continuously compared to a resistor determined Sync Code in the comparator 262. When an appropriate match is determined by the comparator 262 the output thereof, as applied to conductors 296 and 300, goes high which causes the output of OR gate 298 to go high. Under these conditions the latch 270 is enabled and the second 12 bits present in the serial-in/parallel-out shift register 260 will be transferred through the cable 278 into the 12 bit data latch 270.

The flip-flop 264 may take the conventional form of a D-type flip-flop. Thus, for instance, a 74HC74 dual D-type flip-flop, as available from National Semiconductor Corporation, may be employed. When the input of the flip-flop 264 goes high as a result of the comparator 262 indicating the presence of an appropriate Sync Code, the output of the flip-flop 264 on conductor 302 will go low. This low condition on conductor 302 causes the Data Present Not output indicated in FIG. 7 to go low, enables the output of the 12 bit data latch 270 and the 4 bit address latch 272 connected to conductor 304 and causes the Sync Lockout Not line 306 to go low which inhibits further Sync signal detection by comparator 362 as well as in corresponding comparators present in other reproduce modules which may be present in the system. In addition, as indicated by conductor 308, the bit counter 266 is cleared.

The bit counter 266 may take the conventional form of a synchronous binary counter such as available as a 74HC161 chip from National Semiconductor Corporation. The bit counter 266 acts in a conventional manner to count each of the Clock pulses applied from the system timing module through conductor 280 thereto and to generate an output on conductor 318 each time a count of 12 is generated. Upon generation of an output signal on conductor 318 the bit counter 266 resets itself and continues counting clock pulses applied on conductor 280. The output of the bit counter on conductor 318 is applied to the OR gate 298 as indicated and through conductor 312 to the address counter 268. A high on the output conductor 318 will enable the OR gate 298 in the same manner as a Sync pulse presence signal indicated by the comparator 262 on conductor 296.

The address counter or word counter 268 may take the conventional form of a synchronous binary counter which may be formed by a 74HC161 synchronous binary counter chip as available from National Semiconductor. The address counter 268 acts in precisely the same manner as the bit counter 266 in that it counts to twelve and then resets, it being recalled that in the data arrangement set forth herein there are 12 bits per data word in a line and 12 data words per line. The current address or state of the address on word counter 268 is applied through the cable 312 to the 4 bit address latch 272. Additionally, a full count signal is applied through the conductor 314 to the Clear input of the flip-flop 264. Thus, when the address counter 268 has counted 12 data words wherein each data word is represented by a pulse on conductor 312 an end of a line of data is present and the flip-flop 264 is cleared.

The 12 bit data latch 270 may take any of the conventional forms of this well-known device and similarly the 4 bit address latch 272 may be similarly configured. In each case, both devices will latch up the data provided thereto on cables 278 and 312 when a latch signal is produced by the OR gate 298 and the resulting high supplied to the latches 270 and 272 on conductors 316 and 318. The output of each of the latches 270 and 272 are enabled as a function of the level on conductor 304. Thus, for instance, the 12 bit data latch 270 may be configured from one and one half 74HC374-three state OCTAL flip-flops as available from National Semiconductor Corporation while the remaining half of the 74HC374 chip is employed to form the 4 bit address latch 272. Each 12 bit word of data latched into the latch 270 is supplied to the output indicated on cable 320 while the 4 bit address loaded into the 4 bit address latch 272 is available at the output thereof on cable 322.

In operation of the reproduce module illustrated in FIG. 7 separated data applied to the conductor 274 is continuously clocked into the 24 bit serial-in/parallel-out shift register 260. When horizontal lines 20-29 are present and the comparator 262 is thus enabled by the level on conductor 294 the first 12 bits of data loaded into the serial-in/parallel-out shift register 260 are compared to the resistor determined Sync Code generated by the Sync Code generator 290 and applied to the comparator 262 via cable 292. When the comparator 262 determines that an appropriate Sync Code is present the high level generated on conductor 296 will cause OR gate 298 to go high transferring the second 12 bits of data within the shift register 260 into the 12 bit data latch 270. The high level on the output of comparator 262 also sets the Data Present flip-flop 264 so that the output thereof on conductor 302 goes low generating a Data Present signal, enabling the output of the 12 bit data latch 270 and the 4 bit address latch 272 due to the level on conductor 304. Further Sync signal detection is also inhibited by comparator 262 due to the level on conductor 306 and Sync Code detection on any other reproduce module which may be present in the system is inhibited.

As successive Clock pulses are applied to conductor 280 data bits are clocked through the serial-in/parallel-out shift register 260. Each new bit loaded into the serial-in/parallel-out shift register 260 is counted by the bit counter 266 which produces an output on conductor 318 when 12 bits corresponding to a word have been loaded. The high level on conductor 310 is also counted by the address counter 268 and enables the OR gate 298 which produces a high on conductor 316 causing the 12 bit data latch 270 to latch up the 12 bits of data of the new word on cable 278. Similarly the address of that word as indicated by the count of the address counter 268 is latched up by the 4 bit address latch 272 which is commonly enabled by OR gate 298. Thus, successive clock pulses move data through the shift register 260 and index the bit counter 266. On each count of 12 by the bit counter 266 a new data word is transferred into the 12 bit data latch 270 the address counter is advanced by one count and this count is latched into the 4 bit address latch 272.

When the address counter 268 exceeds 12, the data present flip-flop 264 is cleared, the outputs of latches 270 and 272 are disabled and the bit counter 266 is cleared. The address counter 268 and shift register 260 are cleared at the beginning of each horizontal video line by the Key pulse applied to conductor 282. Thus, when the last word of the data block is latched into the output the entire reproduce module is reset. The reproduce module presents data in bit parallel, word serial form on cable 320 and each word is accompanied by a multiplexer address or sample number on cable 322. The data for each line appears in a burst mode in which a data block is decoded entirely during approximately 45 microseconds of one video line. The data thus presented can be employed with a parallel input port of a properly programmed digital computer or it can be reformatted into any of several useful forms by means of auxiliary output modules described below. During the Record mode, the reproduce system set forth in connection with FIG. 6 reads what is being applied to a video tape recorder, transmitter, monitor or the like. During the Reproduce mode it reads what is coming from the video tape recorder or the like.

The embodiment of the reproduce module illustrated in FIG. 7 is suited for data configured by a low speed A to D converter module such as illustrated in FIG. 4. A reproduce module configured for data from a high speed A to D converter module, such as shown in FIG. 5, would correspond to the low speed module illustrated in FIG. 7 except that the bit counter used therein would only count to 10 while the address counter would count to 16 and only the 10 most significant bits of the data latch are employed. The same would be connected in parallel to the low speed reproduce module illustrated in FIG. 7 and the different sync codes employed would determine which is enabled.

Figure 8:
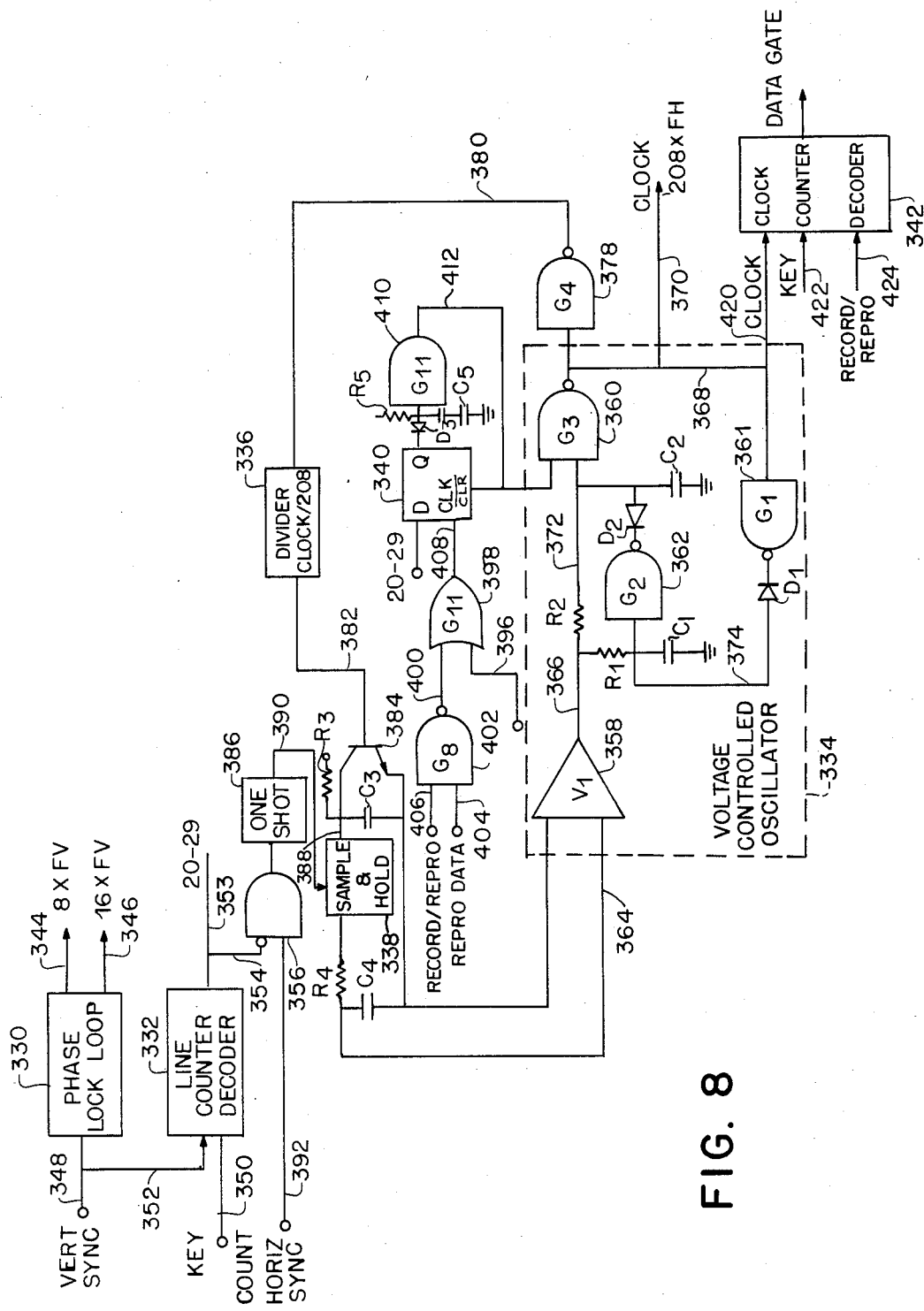
FIG. 8 is a block diagram schematically illustrating an exemplary embodiment of a system timing module suitable for use in the embodiment of the invention illustrated in FIG. 3.

Referring now to FIG. 8 there is shown a block diagram schematically illustrating an exemplary embodiment of a system timing module suitable for use in the embodiment of the present invention. The exemplary system timing module illustrated in FIG. 8 comprises a phase locked loop 330, a line counter/decoder 332, a voltage controlled oscillator indicated by the dashed block 334, a frequency divider 336, a sample and hold amplifier 338, a clock alignment flip-flop 340 and a clock counter decoder 342. The phase locked loop 330 may take the conventional form of a frequency multiplying phase locked loop which acts to generate signals at eight times and sixteen times the vertical frequency F4 as annotated on output conductors 344 and 346. These outputs are employed in connection with the analog multiplexer 110 and the A to D converter 114 in the manner illustrated in connection with the high speed A to D converter module illustrated in FIG. 5.

The frequency multiplying phase locked loop 330 may be formed in the conventional manner by employing a 12 bit binary counter and an integrated circuit phase locked loop. For instance, the 12 bit binary counter may take the form of a 74HC4040 12 bit binary counter chip such as available from National Semiconductor, while a phase locked loop per se may take the form of a CD4046 phase locked loop chip as available from RCA. The conductor 348 as illustrated in FIG. 8 serves as the input to phase locked loop 330 and receives in the manner indicated the Vertical Sync signal as developed by the video module illustrated in FIG. 6 and output on conductor 204. Thus, for each Vertical Sync signal applied to the input of the phase locked loop 330 on conductor 348, the phase locked loop 330 will multiply such signal and produce an output on conductor 344 which has a frequency 8 times the Vertical Frequency while a second output on conductor 346 is provided at a rate of 16 times the Vertical Frequency.

The line counter decoder 332 acts to generate a signal corresponding to the presence of horizontal lines 20–29 which correspond, as aforesaid, to the 10 lines of horizontal information in which digital data corresponding to transducer information is encoded. The line counter decoder 332 may take the conventional form of a 74HC4520 dual 4 bit binary counter such as available from RCA. The line decoder 332 receives Key pulses at the input thereto connected to conductor 350 which are generated once per video line, as aforesaid, as a result of the separated output of the sync separator 176 illustrated in FIG. 6. The line counter decoder 332 thus counts the Key pulses which occur once per horizontal line as aforesaid and, as indicated by the input on conductor 352, is Reset by the Vertical Sync which occurs once per video frame. Thus, line counting starts at the end of the Vertical Sync rather than at the beginning and so it differs from television industry practice by approximately five lines. The output of the counter 332 is adapted to go low as aforesaid for the interval when lines 20–29 are present as indicated by the count of Burst Key signals on conductor 350. The output of the line counter decoder is applied to the conductor 353 and through a second conductor 354 to the inverted input of an AND gate 356.

The voltage controlled oscillator indicated by the dashed block 334 comprises an operational amplifier 358, a NAND gate 360 and inverters 361 and 362. The operational amplifier 358 may take the conventional form of an LF356 operational amplifier such as is available from National Semiconductor. A conventional resistor feedback network (not shown) is provided between the output of the operational amplifier 358 on conductor 366 and the input thereto on conductor 364. The output of the operational amplifier 358 is connected through resistor R2 to one input of NAND gate 360 and through resistor R1 to the junction between the capacitor C1 and the inverter 362. The output of the inverter 362 is connected through a diode D2 to the junction between the capacitor C2 and the input to NAND gate 360. The output of the NAND gate 360 is connected through conductor 368 to the clock output on conductor 370 and to the input of the inverter 361. The output of the inverter 361 is connected through diode D1 to the junction between the resistor R1, the capacitor C1 and the input to inverter 362. The clock output on conductor 370 occurs at a rate as indicated which corresponds to 208 times the horizontal frequency.

The inputs to inverter 362 and NAND gate 360 are controlled by the charging and discharging of the capacitors C1 and C2 which are charged through resistors R1 and R2 from the output of the operational amplifier 358. When the output of the inverter 361 is high, capacitor C1 will charge through the switching threshold of the inverter 362. This will drive inverter 362 low shorting capacitor C2 nearly to ground through diode D2. Thus one input to NAND gate 360 on conductor 372 will go low causing the output thereof on conductor 368 to go high. The high on conductor 368 will cause the output of the inverter 361 to go low. When the output of inverter 361 goes low, capacitor C1 will be shorted almost to ground through diode D1. When this occurs, inverter 362 will be driven high due to the low on the input thereof connected to conductor 374. The output of the inverter 362 then goes high and capacitor C2 begins to charge to the threshold of NAND gate 360. This in turn drives inverter 361 high and begins a new cycle. The frequency of the oscillator is controlled by the charging current through resistors R1 and R2 which is controlled by the voltage output of the operational amplifier 358.

The clock signal developed at the output of the NAND gate 360 is also supplied through an inverter 378 and conductor 380 to the input of the frequency divider 336. The frequency divider 336 acts in the conventional manner to divide the inverter clock frequency by 208 as indicated and may thus be formed by a counter such as 74HC4040 12 bit binary counter as is available from National Semiconductor Corporation. The frequency divider 336 acts to count clock signals applied thereto on conductor 380 in the conventional manner. However, in configuring frequency divider 336 a NAND gate having first and second inputs connected to the 6th and 7th stage thereof is employed while a second NAND gate is connected between the 4th stage and the output of the first gate and the output of this second NAND gate is connected to the Reset of the counter. Under these circumstances, the output of the first AND gate which serves as the output for the frequency divider 336 will remain low for 191 counts or clock pulses and then will go high for counts 192 through 207. At count 207 the counter resets and begins counting again.

When the output of the frequency divider 336 on conductor 382 is high, capacitor C3 will be clamped to ground through transistor 384; however, when the level on conductor 382 is low, the transistor 384 will be OFF and the capacitor C3 will charge through resistor R3. The transistor 384 collector signal is sampled by sample and hold amplifier 338 for the period determined by the output of the One Shot 386, which corresponds to an interval of approximately 4 microseconds. The sample and hold amplifier 338 may take the conventional form of an LF398 sample and hold amplifier as available from National Semiconductor. Thus, the sample and hold amplifier 338 acts in the well known manner to sample the level on the input thereof connected to conductor 388 whenever the sample input thereto connected to conductor 390 is enabled. The sample input on conductor 390 is connected to the output of the one shot 386 which may take the conventional form of one half of a 74HC221 dual One Shot such as available form National Semiconductor Corporation.

The One Shot 386 has a timeout duration of approximately 4 microseconds as aforesaid and is triggered by the horizontal frequency signal as applied to AND gate 356 on conductor 392. It will be noted, however, that whenever the line counter 332 is providing a high output corresponding to the presence of horizontal lines 20-29, the One Shot 386 is not triggered regardless of the presence of the Horizontal Sync signal on conductor 392. Thus, during the presence of lines 20-29, the sample and hold amplifier 338 in the phase locked loop is disabled for this 10 line interval in which, as shall be seen below, phase corrections are made. The disabling of the sample and hold amplifier 338 by applying the 20-29 signal to the active low input connected to conductor 354 effectively allows the voltage controlled oscillator to free run at the frequency set by the horizontal period of line 19.

The collector signal of transistor 384 is thus sampled by the sample and hold amplifier 338 for approximately 4 microseconds as determined by the duty cycle of the One Shot 386. The signal held by the sample and hold amplifier 338 is filtered by the filter formed by the resistor R4 and the capacitor C4 and applied to conductor 364 as an input to the operational amplifier 358 to control the clock frequency.

At equilibrium, the amplitude of the sample and hold amplifier output on conductor 364 is constant. For this to occur, the position of the sample on the ramp must be constant and therefore the phase between the Horizontal Frequency signal and the output of the frequency divider 336 is constant. If the Horizontal Frequency increases by a slight amount between two line periods, the sample occurs sooner, the sample moves down the ramp and the sample amplitude decreases. Under these conditions the output of the operational amplifier 358 increases, increasing the clock frequency. If the Horizontal Frequency decreases, the opposite condition occurs. The average clock frequency during each horizontal line period is determined by the length of the previous line period. Because the phase comparator formed by the transistor 384, the AND gate 356 and the one shot 386 is not low pass filtered, the loop gain is very high and is able to track very large and very rapid fluctuations. In this regard, the time constant of the filter formed by resistor R4 and capacitor C4 is approximately 10 microseconds.

During the 20-29 line interval, a logic 1 is applied to the D input of clock alignment flip-flop 340 in the manner illustrated in FIG. 8. The Horizontal Sync signal or the Composite Sync signal as developed in FIG. 6 is applied to conductor 396 of OR gate 398. The second input to OR gate 398 on conductor 400 is applied from the output of NAND gate 402. The NAND gate 402 receives the Reproduce Data signal and the Record- /Reproduce switch signal on conductors 404 and 406 as produced in the video module illustrated in FIG. 6. The output of the OR gate 398 is applied through conductor 408 to the Clock input of the clock alignment flip-flop 340 which may take the conventional form of a D-type flip-flop. The $\overline{Q}$ output of the D-type flip-flop 340 is connected through diode D3 to the input of the buffer 410. The output of the buffer 410 is connected through conductor 412 to the Clear input of the D-type flip-flop 340 and the top input of NAND gate 360.

At the trailing edge of the Horizontal Sync signal applied to conductor 396 and at every 1-0 transition of the data train, a logic 1 is clocked into the flip-flop 340 setting the $\overline{Q}$ output thereof (not shown) high and the Q output thereof to a Zero condition. This will cause the capacitor C5 to discharge at the input of the buffer 410 driving the output of this gate on conductor 412 low. The low on conductor 412 applied to the Clear input of the flip-flop 340 will Clear the same thus allowing capacitor C5 to charge up to the threshold of the buffer 410 through resistor R5 and once charged to again cause the buffer 410 to switch to a high output condition. During the interval in which buffer 410 is low, the output of NAND gate 360 is forced high to force the output of gate 361 low and the output of inverter 362 high. If the pulse width of the output of buffer 410 is set at one half the nominal Clock period, then buffer 410 returns to a high state, capacitor C2 will be charged approximately to the switching threshold of NAND gate 360 and the output of NAND gate 360 will go high again. The clock is thus phase aligned with the reproduced data stream as applied to the input on 404 of NAND gate 402 with the trailing edge of the Horizontal Sync signal applied to conductor 396.

As was noted above, the sample and hold amplifier 338 in the phased locked loop is disabled during the 20–29 Horizontal line interval in which phase corrections are made by applying the 20–29 line signal to the active low input of the AND gate 356 of One Shot 386. During this interval, the voltage controlled oscillator runs free at the frequency set by the horizontal period associated with horizontal line 19. The suspension of the operation of the phase locked loop during this interval is based upon two assumptions: (1) that during the 630 microsecond interval in which the voltage controlled oscillator indicated by the dashed block 334 runs free any variations in the Horizontal Frequency will be negligible and will be compensated by the phase correction circuitry; (2) that the data transitions on data lines and the apparent data transitions on non-data lines due to video signals or due to system noise when the video signal level happens to be approximately at the video module data separator threshold might cause significant errors in the phase locked loop if the phase lock loop and phase correction circuitry were operating simultaneously. Testing of embodiments of the timer module illustrated in FIG. 8 have indicated that leaving the phase locked loop in operation during the 20–29 interval may be feasible. Hence, if this is done, other well known forms of phase detectors may also be employed rather than the sample and hold ramp type set forth herein. If this were done, the phase locked loop would be employed to continuously set the clock frequency, averaged over each horizontal line, equal to a multiple of the horizontal frequency, with phase corrections by the Horizontal Sync and the Data Stream during the 20–29 period.

Thus, those of ordinary skill in the art will appreciate that the clock signal output on conductor 370 is obtained from a phase locked loop at 208 times the Horizontal Frequency. The voltage control oscillator indicated by the block 334 within the phase locked loop is fed by a sample and hold amplifier 338 which is inhibited during the 20–29 horizontal line interval. The clock therefore tracks changes associated with tape speed changes except during lines 20–29. During lines 20–29 the clock frequency is held constant, but is phase aligned with the trailing edge of the Horizontal Sync in both the record and reproduce modes. In the reproduce mode, the trailing edge of each data transition triggers the flip-flop 340 with a half clock period duration, which clamps the oscillator and aligns it with the data stream. The system timing module illustrated in FIG. 8 serves to track tape recorder jitter frequencies below 1.6 kilohertz and adapts itself to jitter frequencies which effect the data stream during that 630 microsecond time period (1.6 kilohertz corresponds to $$\frac{1}{10 \times 63 \text{ microseconds}}.$$

The clock signal developed is also applied through conductor 420 to the clock counter decoder 342 while Key signals and the condition of the Record/Reproduce switch are applied to conductors 422 and 424. The clock counter decoder 342 may take the conventional form of a 74HC4520 dual 4 bit binary counter which acts to count the clock pulses applied to conductor 420 and generate a data gate signal which goes high at the end of the color burst and remains high for approximately 50 microseconds on each horizontal line. This is employed in the manner described in connection with FIG. 6 in controlling the enabling of the video/data switch 184. The clock counter decoder acts to count the Clock pulses applied thereto on conductor 420 and is Reset once each Horizontal Line by the Key signals applied to conductor 422. The clock counter decoder 342 is enabled by the level on conductor 424 when a Record mode is present and conversely is inhibited during a reproduce mode. The Data Gate signal goes high on the trailing edge of the Key signal applied to conductor 422 and remains high for 160 clock pulses during each line in the record mode.

Referring now to FIG. 9 there is shown a block diagram schematically illustrating an exemplary auxiliary model in the form of a RAM buffer suitable for use in the embodiment of the invention illustrated in FIG. 3. The RAM buffer module illustrated in FIG. 9 acts when connected to a computer's parallel input port to receive burst mode data from the reproduce module illustrated in FIG. 7 so that the same appears to the computer as a read only memory which is revised each 1/60th of a second allowing such burst mode data as loaded therein to be utilized directly by the computer.

The RAM buffer module illustrated in FIG. 9 comprises a random access memory 430, an address multiplexer 432, a status flag generator 434, in input buffer 436 and an output buffer 438. In FIG. 9 interconnection to the data acquisition system according to the instant invention is indicated by the vertical line annotated data system along the right hand margin of the figure while interconnection to a computer is indicated by the vertical line marked computer along the left hand edge of the figure.

The random access memory may typically take the form of a 16×12 RAM which is written into by the data system during its one line burst output mode and read by the computer at any time before the next burst. Thus, the random access memory 430 appears to the computer as a read only memory which is replaced or refreshed 60 times per second. The random access memory may take the form of a 6116LP-3 2048×8 RAM as conventionally available from Hitachi Corporation wherein only a portion of the available memory is employed. Data is supplied to the random access memory 430 from the Data cable 320 which originates on the reproduce module illustrated in FIG. 7. The random access memory 430 is enabled either by the computer for purposes of reading or the data system according to the instant invention for purposes of writing. Accordingly, Data Present signals supplied from conductor 302 are applied to a One Shot 440 each time the output of the 12 bit data latch 270, as illustrated in FIG. 7, is enabled and hence when Data to be written into the random access memory 430 is available on the multiconductor cable 302.

The One Shot 440 may take the conventional form of a 74HC221 dual One Shot or monostable as available from National Semiconductor and acts when triggered by a Data Present level on conductor 302 to produce an Enable level for the duty cycle of the One Shot. Thus, once enabled the One Shot 440 will go high to produce a high on the WRITE line 442 and this same high applied to the OR gate 444 will produce a high at the output thereof connected to conductor 446 to enable the RAM to be written.

Address information for data to be written into the RAM 430 or to be read therefrom is supplied from the address multiplexer 432 through the cable 448. The address information supplied through the cable 448 is 4 bit information. The address multiplexer 432 may take the conventional form of the 74HC157 quad 2-channel multiplexer such as available from National Semiconductor Corporation. Four bit address information for data to be written is supplied thereto on cable 322 from the 4 bit address latch 272 illustrated in FIG. 7. Similarly, line 20-29 timing information is supplied from conductor 352 from the line counter decoder 332 as illustrated in FIG. 8 to provide the data channel address information on the cable 332 with priority during the interval with the random access memory 430 is to be addressed by the data system. Conversely, during periods when line 20-29 information is not being generated by the data system, the random access memory 430 may be read by the computer and during these intervals data channel address information is supplied from the computer via the input buffer 436 and cable 450 to the address multiplexer 432 while a Memory Enable is supplied to the OR gate 444 via conductor 452. Under these circumstances, those of ordinary skill in the art will appreciate that since no WRITE enable is generated on conductor 442 the random access memory 430 will only be enabled by the output of the OR gate 444 so that only read operations can be conducted.

The status flag generator 434 acts, in the conventional manner, to provide random access memory status indications to the computer in the conventional manner. The status flag generator 434 may be formed in the conventional manner by a flip-flop, NAND gate combination such as formed by a 74HC74 and 74HC00 dual-D flipflop and quad 2-input NAND gate combination such as available from National Semiconductor Corporation. The status flag generator 434 acts to receive line 20-29 interval information on conductor 352 and Data Present signal information on conductor 302. When both are present the status flag generator 434 will generate a Busy indication on conductor 460 followed by a New Data indication on conductor 462. Similarly, when the computer has generated a Read RAM Data command on conductor 464 this command will be supplied to the status flag generator 434 on conductor 466 to cause line 460 to reflect a Busy condition. Such a Read command will also cause the Data Not Read line 468, which goes high subsequent to the entry of new data into the RAM, to be Reset to a low condition.

The input buffer 436 acts to receive commands from the computer and couples Address information and Read Enable information to the address multiplexer 432 and the OR gate 444 through the Data cable 450 and the Memory Enable line 452. Thus, the input buffer may take the conventional form of a 74HC573, 3 state octal latch, such as available from National Semiconductor. Address information is supplied from the computer to the input buffer on cable 470 and subsequently gated through conductor 450 to the address multiplexer 432. Similarly, enable information is supplied from the computer over conductor 472 and applied by the input buffer through conductor 452 to the OR gate 444 so that the random access memory 430 is enabled for reading. Read instructions are supplied form the computer through conductor 464 while High Byte and Low Byte information is supplied through conductors 474 and 476 for purposes of causing byte information to be supplied in two passes. The read information High Byte Enable and Low Byte Enable information supplied to the input buffer on conductors 464, 474 and 476 is supplied directly to the control portion of the output buffer 438 through conductors 478, 480 and 482 and the read information is additionally supplied through conductor 466 to the status flag generator 434 as aforesaid.

The output buffer 438 may take the form of two 74HC573 three state octal latches as available from National Semiconductor as aforesaid. Data read from the RAM 430 is supplied thereto in response to reading of the address in the RAM specified via cable 484 and supplied from the latch to the computer through cable 486. Status information supplied from the status flag generator 435 to the output buffer through conductors 462, 468 and 460 is supplied to the computer via conductors 488, 490 and 492.

The RAM buffer module illustrated in FIG. 9 allows burst mode data from the data system according to the instant invention to be loaded into the random access memory 430 when the random access memory 430 is addressed by the data system during the time interval associated with lines 20-29. At other times, the random access memory may be addressed by the computer and this may occur at any time before the next burst from the reproduce module is loaded into the RAM. The random access memory thus appears to the computer as a read only memory which is revised each 1/60th of a second.

Figure 11:
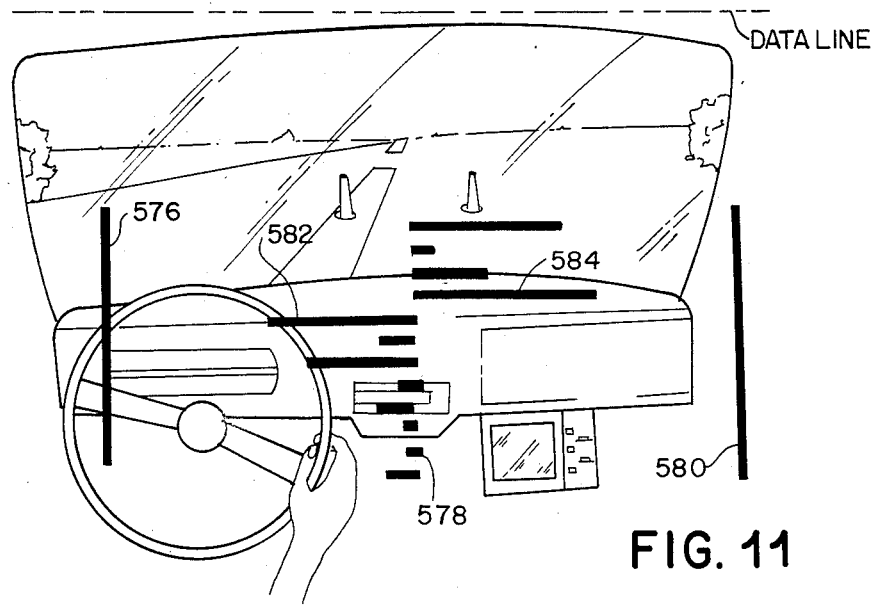
FIG. 11 is a pictorial view illustrating an enhanced mode of data presentation achieved with the exemplary embodiment of the bar graph generator shown in FIG. 10.

Referring now to FIG. 10 there is shown a block diagram schematically illustrating an exemplary embodiment of an auxiliary module in the form of a bar graph generator suitable for use in the embodiment of the invention illustrated in FIG. 3 for generating the bar graph shown in FIG. 11. Thus, the 12 channel bar graph module illustrated in FIG. 10 serves to superimpose over the video picture a plurality of horizontal, white bar graph representations of the data being recorded or reproduced. The bar graph generated is bipolar, i.e. bidirectional about a zero center with 8 bit resolution. For a pleasing appearance, each bar is made to have a width of two horizontal video lines with each bar representing the data generated by one transducer. The bar graph module illustrated in FIG. 10 comprises first and second pulse stretchers 502 and 504 in the form of one shots, a line decoder 506, a column counter 508, an oscillator 510, a FIFO register 512, a comparator 514 and first and second flip-flops 516 and 518. The pulse stretchers 502 and 504 take the form of One Shots or monostables which are employed to inhibit the line counter or row counter 506 and column counter 508 until the same are triggered by the Horizontal and Vertical Sync signals to thus position the grid on the video screen. Thus, the pulse stretchers 502 and 504 may take the form of corresponding halves of a dual one shot such as a 74HC221 dual one shot as available from National Semiconductor. The pulse stretcher 502 receives a Key signal on conductor 520 which is generated by the sync separator 176 in the video module illustrated in FIG. 6 once per horizontal line while the pulse stretcher 504 receives a Vertical Sync pulse on conductor 522 also generated by the sync separator 176 in FIG. 6 once per video frame. Upon receipt of the respective inputs on conductors 520 and 522, pulse stretchers 502 and 504 will be set for the timeout duration thereof and thereafter remove the clear level on the line counter decoder 506 and the column counter 508 so that the same may begin counting lines and columns respectively. Thus, the column counter 508 is enabled to count 256 columns once per horizontal line while the line counter is enabled to count rows once per video frame.

The count input on conductor 528 to the column counter 508 is connected to the output of an 8.6 megahertz oscillator 510 which may be formed by a 74HC132 quad 2-input NAND Schmidt trigger chip available from National Semiconductor configured with a RC timing circuit. Thus, the column counter 508 which may take the conventional form of a 8 bit counter will count the 256 columns at a rate of 8.6 megahertz as generated by the oscillator 510. The 0, 127 and 255 outputs of the column counter are decoded on every video line to form vertical lines for minus a full scale, zero and plus full scale boundaries as indicated by the annotations −FS +FS and 0 indicated on conductors 530, 522 and 534, which are each provided as an input to an exclusive OR gate 536. The 0 output of the column counter 508 is also applied as a set input to the flip-flop 518 through the conductor 538. The column counter 508 also supplies a signal corresponding to the current state of the count therein to the comparator 514 through the cable 540.

In similar manner, the line counter decoder 506 acts when the inhibit or clear level on conductor 526 is removed to count Key pulses applied to conductors 520 and 542. The line counter decoder 506 is connected such that the output thereof is ON for rows 6-7, 14-15 . . . 94-95 while the same is OFF for rows 0-5, 8-13 . . . 88-93 to achieve appropriate gating such that each bar is made two horizontal video lines wide and adjacent bars are separated by six video lines. The outputs of the line counter decoder 506 are applied to the conductor 544 to shift data samples out of the register 512 and to enable the video override signal through the action of AND gate 546 and OR gate 548. The line counter decoder 506 may be formed by a dual four bit binary counter such as a 74HC4520 as is available from RCA together with appropriate AND gates.

The ON outputs of the line counter decoder 506 are applied through conductor 544 to shift data for the appropriate two line pairs selected from the FIFO register 512. The register 512 may take conventional form of a pair of FIFO or first-in/first-out register chips such as CD40105 register chips available from RCA in the form of 4 bit by 16 word FIFO register chips. The pair of register chips would be connected to form 8 bit words or a resulting FIFO register 8 bits wide by 16 words deep. The FIFO register 512 receives data as indicated on the cable 549. This data corresponds to the 8 most significant bits of the 12 bit data information output by the 12 bit latch 270 on the data cable 320 in FIG. 7. Thus, for purposes of the bar graph display shown in FIG. 11, only the 8 most significant bits of each 12 bit data word output by the data latch 270 are utilized. Each 8 bits of data received in parallel is shifted into the FIFO register by shift pulses applied to the conductor 550. The shift pulses applied to conductor 550 correspond to the latch enable pulses applied to conductor 318 in FIG. 7 for purposes of enabling the latch 270. Thus these same pulses are employed to shift each 8 bit word of data for a given line into the FIFO register 512.

Data loaded into the register 512 is shifted in parallel to the output thereof on the cable 552 at a rate determined by the SHIFT OUT pulses supplied to the FIFO register 512 from line counter decoder 506 through the conductor 544. These pulses will occur one each for row pairs 6-7, 14-15 . . . 94-95 so that 12 shift pulses are produced on conductor 544 by the output of the line counter decoder 506 such that two horizontal lines accommodate each of the 12 bit words read from the FIFO register 512. Each shift pulse produced by the line counter decoder 506 is also applied to the bar line enable input of AND gate 546 so that, as shall be seen below, any bar code information generated may be applied to the OR gate 548. Each 8 bit word read from the FIFO register 512 in response to a shift pulse generated by the line counter decoder 506 is applied in parallel to the cable 552 it being noted that shifting occurs such that each word output by the FIFO register 512 is present on the cable 552 for the two horizontal lines associated with the bar code.

In addition to the 8 bit data word supplied on the cable 552 the comparator 514 receives, as aforesaid, the 8 bit count present in the column counter 508. The Column Counter 508 is counting pulses generated by the oscillator 510 to thus keep track of the vertical columns in each row. The comparator 514 may take the conventional form of an 8 bit comparator chip such as 74HC688 available from National Semiconductor Corporation. The comparator 514 acts in the well-known manner to produce a high at the output thereof on conductor 554 whenever the 8 bit count of the column counter 508 as present on conductor 540 corresponds to the 8 bit data word shifted out of the FIFO register 512 onto the cable 552. As the column counter 508 is continuously counting clock pulses for the 256 column positions in each row, this will occur at some point for each row where bar graph data is to be written. Thus, when the data word output by the FIFO register 512 corresponds to the count of the column counter 508 a high will be generated by the comparator on conductor 554 to set the flip-flop 516.

The flip-flop 516 may take the conventional form of a 74HC74 dual-D flip-flop as available from National Semiconductor wherein one half of the device is employed for the flip-flop 516 while the second half of the device is employed for the flip-flop 518. Both the flip-flops 516 and 518 are cleared by Key pulses applied to conductors 520 and 542 and each of the outputs thereof on conductors 556 and 558 are applied to respective inputs of an Exclusive OR gate 560.

The Exclusive OR gate 560 acts in the conventional manner to produce a high at the output thereof connected to conductor 562 when one and only one of the inputs thereto is high and produces a low on conductor 562 for all other input conditions. Under these circumstances it will be appreciated that for data in the form of words read from the FIFO register 512 which are of negative polarity, i.e. to the left of Zero (column 128), Exclusive OR gate 560 will produce a high at the output thereof connected to conductor 562 in response to the flip-flop 516 being set by the comparator 512 and will be turned off in response to the flip-flop 518 being set in response to a Zero (column 128) indication at the output of the column counter 508 as signaled on conductor 538. Conversely, for data signals having a positive polarity with respect to Zero (column 128) the bar output of the Exclusive OR gate 560 on conductor 562 will be turned on at the Zero boundary by the column counter setting flip-flop 518 and turned off by the comparator setting flip-flop 516 when the data word and subsequent column count correspond.

Since the Bar Line Enable AND gate 546 is set by the same shift pulses on conductor 544 associated with the horizontal lines where bar graph information is being read from the FIFO register 512, any bar graph information output by the Exclusive OR gate 560 on conductor 562 will be applied from AND gate 546 through conductor 564 to the OR gate 548. The OR gate 548 acts in the conventional manner to produce a high at the output thereof on conductor 566 whenever any of the inputs thereto go high. A second input to the OR gate 548 is applied through conductor 568 from the output of the OR gate 536 which receives outputs from the column counter corresponding to minus Full Scale (column 0), Zero (column 128) and Full Scale (column 255). Hence, at each of these locations the output of the OR gate 536 on conductor 568 will go high causing bar graph boundary conditions to be generated at the output of the OR gate 548. The output of the OR gate 548 is applied to conductor 566 as an override signal output which is translated to an override input signal for the signal clamping amplifier 182 as illustrated in FIG. 6 and to an operational amplifier 568. The override signal output is supplied as an override input to the video module if the bar graph is to be recorded.

The operational amplifier 568 may take the conventional form of a video buffer such as an HA5033 video buffer available from Harris Corporation. When the bar graph data is employed for monitoring during a test as distinguished from the recording of the same it is supplied to the operational amplifier 568 on conductor 570. The signal on conductor 570 is summed with the video picture signal supplied as a video signal to the operational amplifier 568 on conductor 572. The video signal on conductor 572 is available from the video module illustrated in FIG. 6 from the line annotated To Monitor. The output of the operational amplifier 568 is applied to the conductor 574 for further application to a video monitor or the like.

FIG. 11 illustrates an exemplary bar graph representation obtained by employing the auxiliary module illustrated in FIG. 10. The boundary conditions produced as a result of the outputs of the OR gate 536 in response to minus Full Scale, zero and Full Scale column counts are indicated at 576, 578 and 580. Negative data representations with respect to the Zero (column 128) column are indicated, for example, by bar graph 582 while positive data is indicated by bar graph 584. Those of ordinary skill in the art will appreciate that the real time data display employing bar graph information, as illustrated in FIG. 11, is highly desirable as the extension and reduction in length of the individual bars, as will occur as data changes from frame to frame, is often of greater utility during the actual conducting of a test then employing numerical data since such bar graph information and particularly relative changes therein are readily discernible to a viewer.

Referring now to FIG. 12 there is shown a block diagram schematically illustrating an exemplary embodiment of an auxiliary module in the form of a numeric display generator. The exemplary embodiment of the numeric display generator module illustrated in FIG. 12 comprises a conversion ROM 600, a RAM 602, a digit multiplexer 604, a digit scan counter 606, a character generator ROM 608 and a parallel-in/serial-out shift register 610. The conversion ROM 600 may take any of the conventional forms of Binary to BCD data conversion devices well known to those of ordinary skill in the art. In the instant case, a 27C64 8K by 8 EPROM device such as available from National Semiconductor Corporation was employed. This is an 8K by 8 device which is addressed such that it appears as two 4K by 8 devices. The least significant bit of the address (A0) controls which part is effectively enabled.

Binary data as available from the output of the 12 bit latch 270 on conductor 320 in FIG. 7 is applied to the address inputs to the conversion ROM 600 on cable 612. Only the most significant 11 bits are applied (to A1–A11) which when decoded as offset binary provides a decimal count of −1024 through 1023. Write timing as indicated by the block 614 is supplied to the conversion ROM 600 as the least significant address bit through the conductor 616. Write timing is also supplied to the write enable input of the RAM 602 through conductor 617. The write timing block 614 may be formed by an 9 bit serial-in/parallel-out shift register such as a 74HC164 chip available from National Semiconductor together with a Schmidt trigger NAND gate. A Data Sample Latched input is supplied to the write timing block 614 through the conductor 618. The Data Sample Latched input on conductor 618 may be obtained from the Latch Data input provided to OR gate 298 on conductor 310 in FIG. 7. An enable input is provided to the write timing block 614 on conductor 615 from line decoder and selector 613. The line decoder and selector 613 may take exactly the same form as the line decoder and selector 50 in FIG. 4 where input signals Lines 20–29 and Key provided in conductors 645 and 647 correspond to the same on conductors 76 and 74 in FIG. 4. It will be recalled that up to 10 lines of data may be displayed within lines 20–29. The line decoder and selector 613 acts to select one line so that only numeric information associated with that line is displayed. The output of line decoder and selector 613 on conductor 615 will go high during the selected line. This enables the write timing circuitry of block 614 so that numeric data may be written into the RAM 602.

For each data word presented to the conversion ROM 600 on cable 612 two 8 bit bytes are written into the RAM 602. When an 0 condition is output by the write timing module on conductor 616 the first byte representing the coded Sign, Thousands place and Hundreds place digits is provided on cable 20 and written into the RAM 602. When a 1 condition appears on conductor 616 the second byte representing the BCD coded Tens and Units place digits is available and written to RAM 602. Extended coding may be employed if the conversion ROM to effect leading zero blanking. For instance, if the Thousands place digit is 0 it is not displayed and the sign is moved into its place. Similarly, if the Hundreds or Tens place digit is 0 and is not significant it is blanked and the sign is moved. The Units place digit is always significant and thus is always displayed. Examples of leading zero blanking can be seen in FIG. 2.

The random access memory 602 may take any of the well known forms of this conventional class of device. For instance, a 6116LP-3 2K by 8 RAM chip as available from Hitachi Corporation may be employed to form a 32 by 8 RAM device. A write enable level is supplied to the random access memory 602 through the conductor 617 from the write timing block 614 and a chip select signal is supplied through the conductor 622 from the display frequency select counter 624. The display frequency select counter 624 may take the conventional form of a 74HC161 synchronous binary counter as available from National Semiconductor combined with a 74HC4520 dual 4 bit binary counter as available from RCA to form a switch selectable divide by 1, divide by 16 or divide by 32 counter circuit.

The display frequency select counter 624 input on conductor 626 the once per frame Video Sync signal generated by the sync separator 176 on conductor 204 in the video module illustrated in FIG. 6. This once per frame signal is divided by 1, 16 and 32 by the display frequency select counter 624. The desired output of display frequency select counter 624 may be established by a dip switch or the like so as to provide an appropriate chip select level on conductor 622 for the RAM 602. The provision of the chip select on the conductor 622 from the display frequency select counter 624 is to enable the RAM 602 to be loaded at a selective rate from the conversion ROM 600. Thus, every field (divide by 1) would be used in single frame or slow motion video displays. Alternatively, limiting loading to once every 16 or 32 fields would be employed to prevent the output from changing too fast to be readable and fully usable by the viewer. This is accomplished by the display frequency select counter 624.

The Vertical Sync signal applied to the conductor 626 is also applied through the conductor 628 to a Delay One Shot 630. The Delay One Shot 630 may take the form of a conventional monostable such as one half of a 74HC221 dual One Shot as available from National Semiconductor. The output of the Delay One Shot 630 is applied to the Window One Shot 632 through the conductor 634. The Window One Shot may be formed from the other half of the 74HC221 dual One Shot.

The output of the window one shot is connected through the conductor 636 to the digit scan counter 606. The purpose of the Delay One Shot 630 and the Window One Shot 632 is to configure what is set forth on the video display. It will be recalled that the numeric display will decode twelve binary words of data and display them as twelve decimal words vertically on the video screen. The Delay One Shot 630 and the Window One Shot 632 serve to jointly create a window so that all but a portion of the numeric display is masked out and not output to the video screen. For example it may be desired to observe only the data corresponding to the third and fourth channels of data. In this case the window would first open on a line between the second and third decimal words. The window would close on a line between the fourth and fifth decimal words and the display of the remaining decimal words on the screen would be disabled. It should be noted that all twelve channels are still decoded and as such are present in RAM 602. Only the actual display of this data is inhibited. The One Shot 602 is set upon the appearance of the Vertical Sync pulse on conductor 628 and upon the completion of the timeout duration of the monostable, the trailing edge of the pulse producing on conductor 634 will set the Window One Shot 632, in effect opening the window. The purpose of the Window One Shot 632 is to insert a delay so that the digit scan counter 606 is enabled for a time duration which corresponds to the size of the portion of the numeric display which is to be set forth. On completion of this delay the output of the Window One Shot 632 on conductor 636 returns low in effect closing the window. The Delay One Shot 630 and the Window One Shot 632 permit all of the numeric display to be seen or any restricted portion of the complete display depending on the length of the delays inserted. Both the Delay One Shot 630 and the Window One Shot 632 have adjustable timeout durations.

Addressing of the RAM 602 is controlled by the address multiplexer 640 which is connected to the random access memory 602 through the conductor 642. More particularly, the operation of the RAM 602 is such that BCD data supplied on cable 620 is only written into the RAM during the line 20-29 interval. During other times the RAM is placed in the Read mode. The address multiplexer 640 may take the conventional form of a 75HC257 quad 2 channel 3 state multiplexer as available from National Semiconductor.

Address data corresponding to the address of information to be written into the RAM 602 is supplied to the address multiplexer 640 as 4 bits in parallel from the input conductor 644 annotated Data Address. The input to conductor 644 is generated by the 4 bit address latch 272 illustrated in FIG. 7 and corresponds to the address output provided by the 4 bit address latch 272 on output conductor 322. Thus, 4 bit address information supplied to the address multiplexer 640 on the cable 644 is supplied to the RAM 602 when data is to be written into the RAM 602 and this address information corresponds to the address for the 16 bits of data supplied in two passes on the cable 620 to RAM 602. The write input supplied to the address multiplexer 640 on conductor 646 corresponds to the line 20-29 interval input supplied to conductor 648. The line 20-29 input applied to conductor 648 is generated by the line counter decoder 332, in the system timing module illustrated in FIG. 8. Thus the output on conductor 352 in FIG. 8 is applied to the conductor 648 and it will be recalled that this input is active during the interval of the 10 horizontal lines, i.e. lines 20-29, where transducer data is written.

The line 20-29 input on conductor 648 is also applied to the Vertical Position One Shot 650. The Vertical Position One Shot 650 may also take the form of one half of a 74HC221 One Shot chip such as available from National Semiconductor as a dual One Shot. The Vertical Position One Shot 650 inserts a delay in the line 20-29 interval information supplied thereto so that the trailing edge of the pulse produced by the One Shot 650 on conductor 652 corresponds to the row position where it is desired that the numerical information be produced.

When the level on conductor 646 to the address multiplexer 640 is high, Data Address information supplied on cable 644 is applied through cable 642 to the RAM 602 so that the same is enabled for a write operation and data present on cable 620 is written into the address defined on cable 644. At other times, read address information supplied by the read address counter 654 is supplied to the address multiplexer 640 on the cable 656. When the address multiplexer 640 is not enabled for a write operation by the level on conductor 646, read address in formation applied to the cable 656 will be supplied to the RAM 602 through the cable 640.

The read address counter 654 may take the conventional form of a counter such as one half of a 75HC4520 dual 4 bit binary counter available from RCA. The Enable input to the read address counter 654 is connected as indicated in FIG. 12 through conductor 652 to the output of the Vertical Position One Shot 650 such that the read address counter 654 is only enabled during the presence of rows on the display in which numeric information is to be supplied. The second input to the read address counter 654 is supplied through the cable 658 from the output of the row counter 660 which is applied to the cable 662. The row counter 660 is a 4 bit counter which may be formed by a 74HC161 synchronous binary counter chip available from National Semiconductor. The row counter 660 serves to define row information for each character defined by BCD information read from the RAM 602 and applied to the character generator ROM 608. The row counter 660 receives Key pulse information supplied thereto on conductor 664. Such Key pulse information is generated by the sync separator 176 illustrated in the video module in FIG. 6 and occurs after the burst information associated with each horizontal line.

The RAM 602 is written into only during the presence of the line 20-29 interval as aforesaid and during all other times the same is in a read mode. During a read mode each pair of 8 bit bytes read from the RAM 602 alternately is supplied to the digit multiplexer 604. The address read in each section of the RAM 602 is defined by the read address counter 654 and applied through the address multiplexer 640 to the RAM 602 through the cable 642.

The digit multiplexer 604 may take the form of a 74HC253 dual 4 channel 3 state multiplexer such as is available from National Semiconductor Corporation. The output of the digit multiplexer 604 is applied through the cable 668 to the character generator ROM 608. The output of the digital multiplexer 604 on cable 668 takes the form of 4 BCD bits in parallel defining the characters whose dot information is to be read from the character generator ROM. Each 4 bit data group is read from the digit multiplexer 604 under the control of the digit scan counter 606 whose output is applied to the digit multiplexer 604 via the cable 670. For a given input from the RAM 602 the digital multiplexer 668 will initially apply 4 bit BCD information to the character generator ROM 608 in the following order: sign, followed by the thousands, hundreds, tens and units digits.

The digit scan counter 606 may take the form of one half of a 74HC4520 dual 4 bit binary counter such as available from RCA and as will be readily appreciated by those of ordinary skill in the art may employ the other half section of the same chip as employed for the row counter 660. Timing information to define the portion of the numeric display to be seen is applied to enable the digit scan counter 606 from the Delay One Shot 630 and the Window One Shot 632 via the conductor 636. The digital scan counter 606 is also enabled on conductor 672 by the trailing edge of the key pulse applied to conductor 669 which Key pulse is further applied to the Horizontal Position One Shot 674 and stretched thereby in accordance with the timeout duration selected for the One Shot. The Horizontal Position One Shot 674 may be formed by one-half of a 74HC221 dual One Shot as provided by National Semiconductor.

The digit scan counter 606 counts pulses provided from the output of the dot clock oscillator 680 whose output is divided by 16 as indicated. The dot clock oscillator 680 may be formed by an RC circuit and NAND Schmidt trigger configured from a quad 2 input NAND Schmidt trigger such as available as a 74HC132 chip produced by National Semiconductor Corporation. The divided down output of the dot clock oscillator 680 is provided to the digit scan counter 606 through the cable 682 while the direct output of this oscillator is provided to the parallel-in/serial-out shift register 610 through the cable 684.

The character generator ROM 608 may take the conventional form of a 27C64 EPROM such as available from National Semiconductor. The character font of this particular character generator ROM is 7 dots high by 10 dots wide and occupies a cell which is 15 lines high by 16 columns wide. The digital scan counter 606 is therefore incremented by the dot clock 680 divided by 16 on cable 682 while the row counter 660 increments the RAM address counter every 15th row. Thus, address information supplied from the digital multiplexer 668 defines the character to be addressed within the character generator ROM 608. Information from the row counter 660 on cable 662 defines which of the 15 rows of that character is to be read from the character generator ROM 608 and applied in parallel through the cable 686 to the parallel-in/serial-out shift register 610.

The serial output of the shift register 610 is supplied as a Video Override signal output on the conductor 688. This output of the numeric display module is applied as an override input on conductor 226 of the signal clamping amplifier 182 in the video module illustrated in FIG. 6 and will result in the numerical display illustrated along the right hand side of FIG. 2. Those of ordinary skill in the art will appreciate that depending upon the setting of the Delay One Shot 630 and the Window One Shot 632, different portions of the numeric display may be set forth. Thus the video override signal output on conductor 688 in FIG. 12 acts in effect as an override input on the video module for superimposing the numeric information generated by the character generator ROM 608 onto the video picture in the manner illustrated in FIG. 2.

The real time video data acquisition system set forth herein is highly advantageous in that it allows, for the first time, the real time superposition of data acquired from transducers on video and audio information acquired as testing is being conducted. Thus measured instrument data is presented on a composite of what a test driver or the like perceives. Thus while variations and alternatives are available for both the apparatus and methods set forth to accommodate the requirements or preferences of specific applications, the integrated techniques set forth herein provide a generalized approach which fully admits of such variations.

For instance, while only a RAM buffer module for use in connection with a computer's parallel input port, a bar graph display and a numeric display have been illustrated as exemplary modules, other forms of auxiliary output modules will readily occur to those of ordinary skill in the art. Thus, 12 channel digital to analog converters may be employed to enable the output of the low speed reproduce module to be played onto conventional strip chart recorders while one or two channel D-A converters may be utilized for the same purpose with respect to the output of high speed reproduce modules.

Those of ordinary skill in the art will also appreciate that while this invention has been set forth in connection with relatively specific exemplary embodiments which employ specific integrated circuits and configurations therefor, alternate configurations and circuit designs employing different integrated circuits or discrete components may be used. This is particularly so where special applications of the real time video data acquisition system requires specialized features or has resolution requirements which differ from the generalized embodiment set forth herein. This will also be true in applications other than testing or in some cases where different test environments, items to be tested, or test conditions are involved.

Thus, although the instant invention has been described in connection with a highly specific exemplary embodiment thereof, it will be understood that many modifications and variations thereof will be readily apparent to those of ordinary skill in the art. Therefore, it is manifestly intended that this invention be only limited by the claims and the equivalents thereof.

What is claimed is:

1. An instrumentation data acquisition system of the type employing at least one instrumentation transducer operative to monitor a given condition of a test subject or object and to provide a transducer signal output in real time indicative of said condition, said data acquisition system operative to provide a video display, characteristic of said test subject or object performing given test routines wherein said given condition is related to said test routines, comprising in combination:

means for generating video signals corresponding to visual scenes to be recorded and indicative of said test routines, means responsive to said video signals for processing said signals according to predetermined levels, including means for amplifying, clamping and scaling said video signal and including means for separating from said video signal the horizontal and vertical sync signals to provide at an output a processed video signal;

means responsive to said transducer signal output for digitizing said signal for each television field and formatting said signal into a data block;

means responsive to said data block for inserting said data block in digital form to occupy at least one horizontal television line in said processed video signal as a data line which data line replaces the television picture content of said horizontal line and including means responsive to said separated sync signals for synchronizing said data line to said television field as included in said video signal; and selectable means responsive to said data line included in said video signal to convert said digitized signal into a transducer related display indicative of numerical relationships of said transducer output signal for superimposing said transducer display within said video display according to said television field containing said data line, whereby when said means are selected said superimposed transducer display displays said numerical relationships in real time and according the value of said transducer signal as provided during said television frame and indicative of said condition.

2. The data acquisition system according to claim 1 wherein said horizontal television line is a horizontal line that is displayed when said video signal is applied to a television monitor.

3. The data acquisition system according to claim 1 further including an array of test instrumentation transducers operative to monitor respective conditions of said test subject or object during said televised test routines to provide a plurality of transducer output signals and means for multiplexing said plurality of output signals and for digitizing said signals in said array, and including means for organizing said digitized signals in said array into a data block, and means for inserting said data block into a horizontal television line with the line indicative of a data line and with said data block being updated for each video field.

4. The data acquisition system according to claim 3 wherein said horizontal television line includes a plurality of horizontal television lines as horizontal lines 20 to 29 of the television field.

5. The data acquisition system according to claim 1 wherein said selectable means includes a bar graph generator means operative to provide a bar graph display of said transducer signal superimposed upon said television display.

6. The data acquisition system according to claim 1 wherein said selectable means includes a numeric generator means operative to provide a numeric display superimposed upon said television display.

7. The data acquisition system according to claim 1 wherein selectable means includes a computer interface means responsive to said data line to process said data according to said digitized information.

8. The data acquisition system according to claim 1 wherein said selectable means includes a video tape recorder responsive to said processed video signal as including said data line to record said signal for future playback.

9. The data acquisition system according to claim 1 wherein said means for synchronizing said data line to said television field includes means responsive to said data block and said processed video signal to provide a clock output whose frequency and phase are controlled by said data and video signal.

10. The data acquisition system according to claim 1 wherein said data block as inserted in said data line includes a synchronizing signal which signal is followed by data signals.

11. The data acquisition system according to claim 3 wherein each of said data blocks consists of a plurality of 12 bit data words.

12. The data acquisition system according to claim 3 wherein each of said data blocks consists of a plurality of 10 bit data words.

13. An instrumentation data acquisition system of the type employing a plurality of instrumentation transducers operative to monitor conditions of a subject or object and to provide real time transducer analog output signals indicative of said monitored conditions, said data acquisition system operative to provide a video display of said subject or object performing given test routines wherein said monitored conditions are related to said test routines, comprising in combination:

means for generating video signals corresponding to the visual scenes to be recorded and indicative of said test routines as performed;

means responsive to said video signals for processing said video signals including means for amplifying, clamping and scaling said video signals according to predetermined levels and for separating from said video signals, synchronization components;

means responsive to said transducer signals for digitizing each of said signals to provide output digitized data block signals indicative of said transducer analog output signals;

timing means responsive to said synchronization components to provide a synchronized timing signal operative to synchronize said data block signals to said television frame;

means responsive to said processed video signal and said data block signals for inserting a data block signal onto at least one horizontal line of said video signal by replacing the picture content of said line with said data block signal to form a data line signal and including a sync word signal indicative of said data block as inserted on said horizontal line, to provide an output video signal including said data line signal; and auxiliary means responsive to said output video signal and said synchronized timing signal and operative to process said output video signal to provide a television display containing information indicative of said transducer signals as contained in said data line together with the televised video scene as present in said output video signal and indicative of said test routine being performed whereby said data line contains said transducer information as related in real time to said test routine as displayed.

14. The data acquisition system according to claim 13 wherein said auxiliary means includes a bar graph generator means responsive to said video output signals and said data line to provide a bar graph presentation of said data line signals superimposed upon said television scene.

15. The data acquisition system according to claim 13 wherein said auxiliary means includes a numeric generator means responsive to said video output signal and said data line to provide a numeric display presentation of said data line signals superimposed upon said television scene.

16. The data acquisition system according to claim 13 wherein said auxiliary means includes a video monitor means responsive to said video output signal and said data line to provide a display presentation of said data line superimposed upon said television scene.

17. The data acquisition system according to claim 13 wherein said auxiliary means includes a video tape recording means responsive to said video output signal and said data line for recording said signal on a video tape associated with said recorder means.

18. The data acquisition system according to claim 13 wherein said auxiliary means includes a computer interface means responsive to said video output signal for directing said signal and said data line to a computer for processing said signal to provide numerical data from said data line.

19. The data acquisition system according to claim 13 further including multiplexer means responsive to said transducer signals at an input to multiplex said signals at an output and operative over several television lines to provide digitized signals from said multiplexed signals and means for storing said signals to provide a data block which is inserted into one horizontal line as a data line to replace the visible picture portion of said horizontal line.

20. The data acquisition system according to claim 13 including means for inserting said data block signals on more than one horizontal line.

21. The data acquisition system according to claim 13 wherein said data block consists of a 12 bit identification sync word followed by twelve 12 bit data words.

22. The data acquisition system according to claim 13 wherein said data block consists of a 12 bit identification sync word followed by sixteen 10 bit data words.

23. The data acquisition system according to claim 13 wherein said timing means includes an oscillator controlled in frequency by a phase lock loop responsive to said horizontal synchronizing signal to lock said oscillator to a multiple of said horizontal frequency of said video signal.

24. The data acquisition system according to claim 23 including means coupled to said phase lock loop for inhibiting a change of oscillator frequency during said horizontal line interval accommodating said data line.

25. The data-acquisition system according to claim 23, wherein said oscillator is further controlled by being phase aligned to said horizontal sync signal.

26. The data-acquisition system according to claim 25 wherein said oscillator is further phase aligned according to said data line.

27. The data-acquisition system according to claim 13, including means for converting said data line signal information into analog information corresponding to the original transducer signal outputs.

* * * * *